(12) United States Patent
Enga

(10) Patent No.: US 12,578,854 B2
(45) Date of Patent: *\*Mar. 17, 2026

(54) COMPOSITE OPERATIONS USING MULTIPLE HIERARCHICAL DATA SPACES

(71) Applicant: Craxel, Inc., Chantilly, VA (US)

(72) Inventor: David Enga, Chantilly, VA (US)

(73) Assignee: Craxel, Inc., Chantilly, VA (US)

( * ) Notice: Subject to any disclaimer, the term of this patent is extended or adjusted under 35 U.S.C. 154(b) by 267 days.

This patent is subject to a terminal disclaimer.

(21) Appl. No.: 18/352,518

(22) Filed: Jul. 14, 2023

(65) Prior Publication Data

US 2023/0359354 A1 Nov. 9, 2023

Related U.S. Application Data

(63) Continuation of application No. 17/808,968, filed on Jun. 24, 2022, now Pat. No. 11,740,788.

(Continued)

(51) Int. Cl.
*G06F 3/00* (2006.01)
*G06F 3/06* (2006.01)

(52) U.S. Cl.
CPC .......... *G06F 3/0604* (2013.01); *G06F 3/0631* (2013.01); *G06F 3/0644* (2013.01); *G06F 3/067* (2013.01)

(58) Field of Classification Search
CPC .... G06F 3/0604; G06F 3/0631; G06F 3/0644; G06F 3/067
See application file for complete search history.

(56) References Cited

U.S. PATENT DOCUMENTS

| | | | |
|---|---|---|---|
| 5,701,467 A | 12/1997 | Freeston | |
| 5,864,857 A | 1/1999 | Ohata et al. | |

(Continued)

FOREIGN PATENT DOCUMENTS

| | | |
|---|---|---|
| WO | 0203237 A1 | 1/2002 |
| WO | 2014094047 A1 | 6/2014 |

OTHER PUBLICATIONS

Anjum et al. BangA: An efficient and flexible generalization-based algorithm for privacy preserving data publication. 2017. Computers, 6(1), 1. doi:http://dx.doi.org/10.3390/computers6010001. (Year: 2017).

(Continued)

*Primary Examiner* — Craig S Goldschmidt
(74) *Attorney, Agent, or Firm* — CM Law PLLC

(57) ABSTRACT

Method and apparatus for performing an operation are described. A method includes choosing at least one primary logical hierarchical data space. The at least one primary logical hierarchical data space may have a plurality of subdivisions. The method may further include determining at least one subdivision of the at least one primary logical hierarchical data space. The method may further include choosing at least one secondary logical hierarchical data space. The at least one secondary logical hierarchical data space may have a plurality of subdivisions. The method may further include determining at least one subdivision of the at least one secondary logical hierarchical data space. The method may further include performing at least one operation corresponding to the at least one subdivision of the at least one primary logical hierarchical data space. The method may further include performing at least one operation corresponding to the at least one subdivision of the at least one secondary logical hierarchical data space.

63 Claims, 17 Drawing Sheets

Related U.S. Application Data

(60) Provisional application No. 63/266,885, filed on Jan. 18, 2022.

(56) References Cited

U.S. PATENT DOCUMENTS

| | | | |
|---|---|---|---|
| 6,223,182 B1 | 4/2001 | Agarwal et al. | |
| 6,252,547 B1 | 6/2001 | Perry et al. | |
| 6,401,029 B1 | 6/2002 | Kubota et al. | |
| 6,542,819 B1 | 4/2003 | Kovacs et al. | |
| 6,636,802 B1 | 10/2003 | Nakano et al. | |
| 6,954,697 B1 | 10/2005 | Smith | |
| 7,382,244 B1 | 6/2008 | Donovan et al. | |
| 7,454,435 B2 | 11/2008 | Friedman et al. | |
| 7,720,436 B2 | 5/2010 | Hamynen et al. | |
| 10,416,919 B1 * | 9/2019 | Cai | G06F 3/0643 |
| 2001/0045965 A1 | 11/2001 | Orbanes et al. | |
| 2002/0004917 A1 | 1/2002 | Malcolm et al. | |
| 2002/0055924 A1 | 5/2002 | Liming | |
| 2002/0091696 A1 | 7/2002 | Craft et al. | |
| 2002/0115453 A1 | 8/2002 | Poulin et al. | |
| 2002/0160766 A1 | 10/2002 | Portman et al. | |
| 2002/0161627 A1 | 10/2002 | Gailey et al. | |
| 2002/0161647 A1 | 10/2002 | Gailey et al. | |
| 2002/0184200 A1 | 12/2002 | Ueda et al. | |
| 2003/0036848 A1 | 2/2003 | Sheha et al. | |
| 2003/0220835 A1 | 11/2003 | Barnes | |
| 2004/0019581 A1 | 1/2004 | Davis et al. | |
| 2004/0230467 A9 | 11/2004 | Gailey et al. | |
| 2005/0015307 A1 | 1/2005 | Simpson et al. | |
| 2005/0030194 A1 | 2/2005 | Cheng et al. | |
| 2006/0149774 A1 | 7/2006 | Egnor | |
| 2006/0206507 A1 | 9/2006 | Dahbour | |
| 2006/0265197 A1 | 11/2006 | Peterson | |
| 2007/0016565 A1 | 1/2007 | Evans et al. | |
| 2007/0041336 A1 | 2/2007 | Wan et al. | |
| 2007/0112808 A1 | 5/2007 | Howard et al. | |
| 2007/0258623 A1 | 11/2007 | McGrath et al. | |
| 2008/0086464 A1 | 4/2008 | Enga et al. | |
| 2008/0126403 A1 | 5/2008 | Moon | |
| 2008/0183730 A1 | 7/2008 | Enga | |
| 2009/0164459 A1 | 6/2009 | Jennings et al. | |
| 2009/0192903 A1 | 7/2009 | Weiss et al. | |
| 2009/0307067 A1 | 12/2009 | Obermeyer | |
| 2010/0017261 A1 | 1/2010 | Evans et al. | |
| 2010/0042519 A1 | 2/2010 | Dingler et al. | |
| 2011/0016157 A1 | 1/2011 | Bear et al. | |
| 2012/0124289 A1 | 5/2012 | Kavuri et al. | |
| 2013/0198237 A1 | 8/2013 | Serban et al. | |
| 2014/0012959 A1 | 1/2014 | Round | |
| 2014/0074769 A1 * | 3/2014 | Cushing | G06F 16/901 |
| | | | 707/E17.014 |
| 2015/0356139 A1 | 12/2015 | Demir | |
| 2015/0356140 A1 | 12/2015 | Demir | |
| 2016/0321375 A1 | 11/2016 | Liu et al. | |
| 2017/0068688 A1 | 3/2017 | Brodt et al. | |
| 2017/0169233 A1 | 6/2017 | Hsu et al. | |
| 2017/0250798 A1 * | 8/2017 | Enga | H04L 9/0643 |
| 2017/0308578 A1 | 10/2017 | Chen et al. | |
| 2018/0349422 A1 | 12/2018 | Tsuchida et al. | |
| 2020/0042518 A1 | 2/2020 | Brunel et al. | |
| 2020/0151268 A1 | 5/2020 | Johnson et al. | |
| 2021/0133929 A1 * | 5/2021 | Ackerson | G06T 3/4076 |
| 2021/0209088 A1 | 7/2021 | Zheng et al. | |

OTHER PUBLICATIONS

CRAX-107WO1 WO/ISR dated Sep. 22, 2022 in PCT/US22/73168.

CRAX108WO1_International Search Report and Written Opinion dated Sep. 16, 2022 cited in PCT/US2022/073169, 9 pages.

CRAX109WO1_International Search Report and Written Opinion dated Sep. 16, 2022 cited in PCT/US2022/073170, 9 pages.

CRAX110WO1_International Search Report and Written Opinion dated Sep. 16, 2022 cited in PCT/US2022/073171, 8 pages.

Freeston The BANG file: a new kind of grid file. The BANG file: A new kind of grid file. 1987. In Proceedings of the 1987 ACM SIGMOD international conference on Management of data (SIGMOD '87). Association for Computing Machinery, New York, NY, USA, https://doi.org/10.1145/38713.38743 (Year: 1987).

Graybox "Storing Hierarchical Data in a Database." Sep. 10, 2014, retrieved by ISA/US in PCT/US2022/073169 on Aug. 14, 2022 (Aug. 14, 2022) from <www.graybox.co/knowledge/blog/storing-hierarchical-data-in-a-databases.

Liu et al. "Research and implementation of mass remote sensing image data storage and management." 2010 IEEE International Conference on Progress in Informatics and Computing. vol. 1. IEEE, 2010.Dec. 12, 2010 (Dec. 12, 2010) Retrieved on Aug. 13, 2022 from in PCT/US2022/073171.

Nadel. "Creating a Composite Index Using Ancestral Keys in a Hierarchical Database Table Design." Jun. 24, 2019, retrieved by the ISA/US in PCT/US2022/073170 on Aug. 12, 2022 from.

Nievergelt et al. The Grid File: An Adaptable, Symmetric Multikey File Structure. 1984. ACM Trans. Database Syst. 9, 1 (Mar. 1984), 38-71. https://doi.org/10.1145/348.318586 (Year: 1984).

Szalay, "Indexing the Sphere with the Hierarchical Triangular Mesh," Technical Report MSR-TR-2005-123, Microsoft Research, Redmond WA, Aug. 2005, 23 pages, in U.S. Appl. No. 11/905,810.

* cited by examiner

100

| Column | Constraints | Data Type | Logical Data Space 1 | Logical Data Space 2 |
|---|---|---|---|---|
| Name | PK | Varchar(64) | String Space 1 | String Space 2 |
| Birth Date | None | Datetime | DateTime Space 1 | DateTime Space 2 |
| Age | None | Integer | Int Space 1 (0,150) | Int Space 2 (0,150) |
| Salary | None | Numeric | Numeric Space 1 | Numeric Space 2 |
| Location | Unique | Geospatial | Geospatial Space 1 | Geospatial Space 2 |

| Physical Hierarchical Data Space | Key | Logical Hierarchical Data Space 1 | Logical Hierarchical Data Space 2 |
|---|---|---|---|
| A | Name | String Space 1 | String Space 2 |
| B | Location | Geospatial Space 1 | Geospatial Space 2 |

FIG.1B

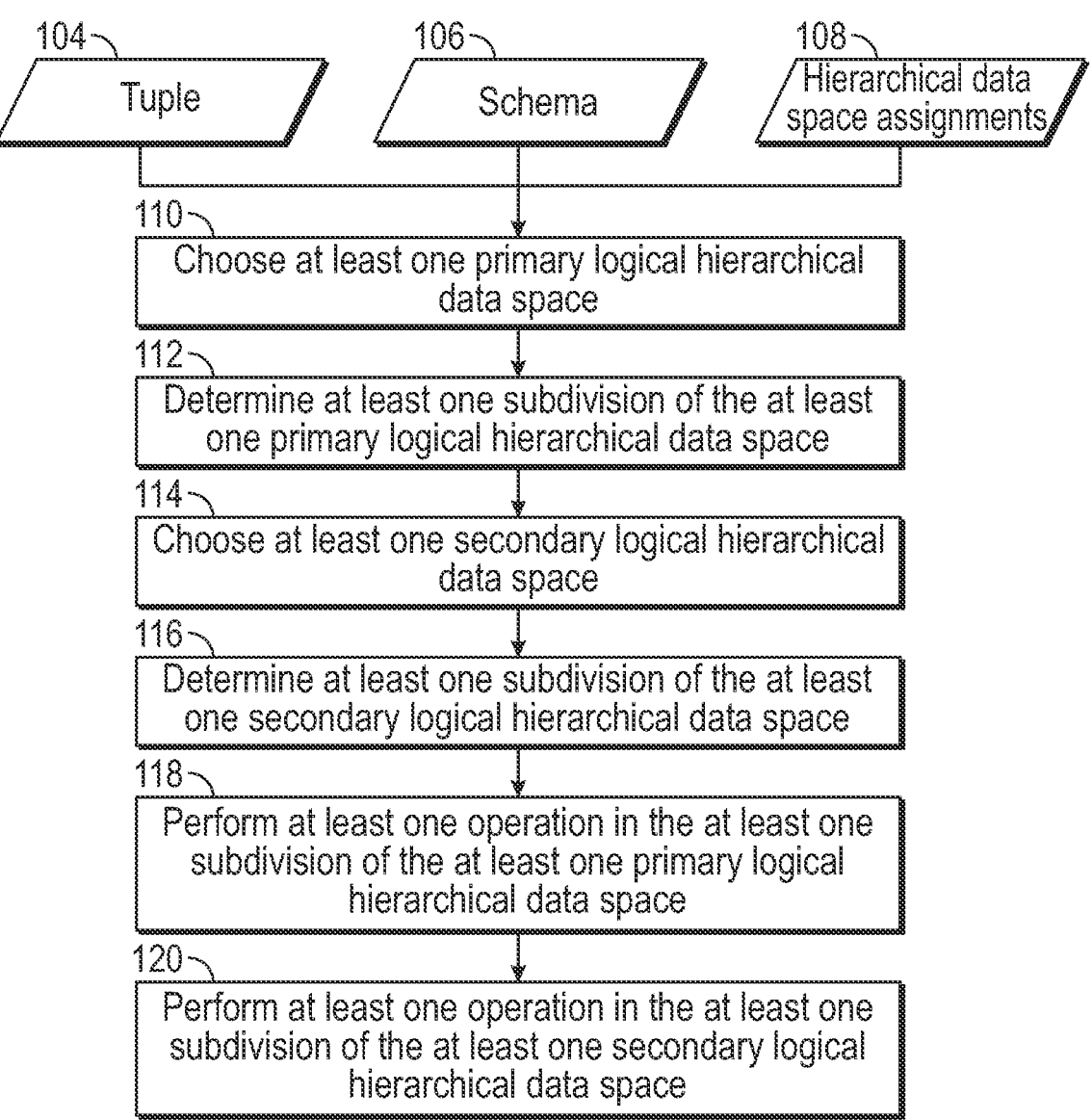

104 — Tuple

106 — Schema

108 — Hierarchical data space assignments

110 — Choose at least one primary logical hierarchical data space

112 — Determine at least one subdivision of the at least one primary logical hierarchical data space 114 — Choose at least one secondary logical hierarchical data space 116 — Determine at least one subdivision of the at least one secondary logical hierarchical data space 118 — Perform at least one operation in the at least one subdivision of the at least one primary logical hierarchical data space 120 — Perform at least one operation in the at least one subdivision of the at least one secondary logical hierarchical data space

FIG.1C

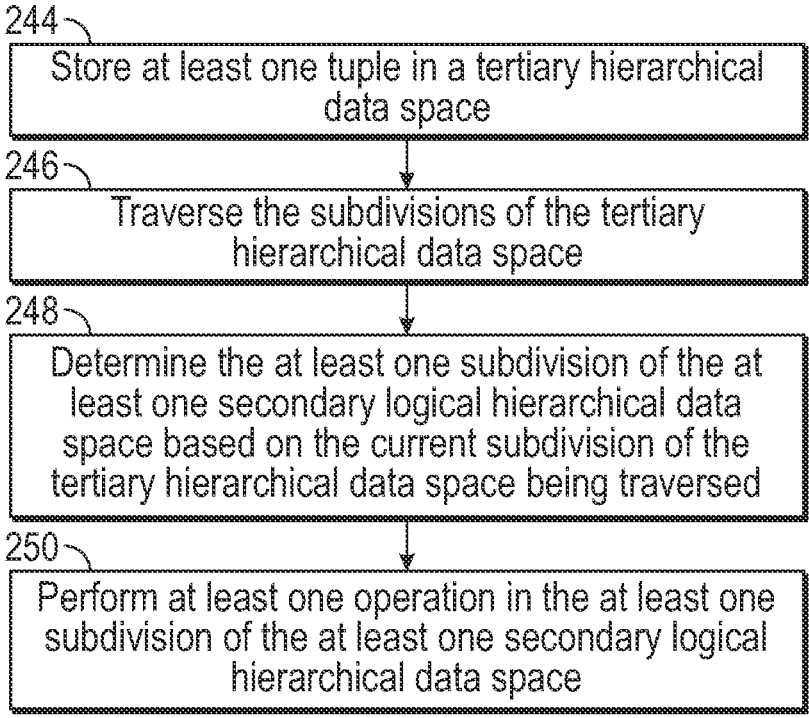

244 —
Store at least one tuple in a tertiary hierarchical data space

246 —
Traverse the subdivisions of the tertiary hierarchical data space

248 —
Determine the at least one subdivision of the at least one secondary logical hierarchical data space based on the current subdivision of the tertiary hierarchical data space being traversed 250 —
Perform at least one operation in the at least one subdivision of the at least one secondary logical hierarchical data space

FIG.2B

334
| A | B |
|---|---|
| α {0-11} | 1 {0-00} |
| β {0-00-10-01} | 1 {0-00} |
| β {0-00-10-01} | 2 {0-01-00} |
336
| A | B |
|---|---|
| α {0-11} | 3 {0-01-11-00} |
| β {0-00-10-01} | 4 {0-01-11-01} |
FIG.3C
338
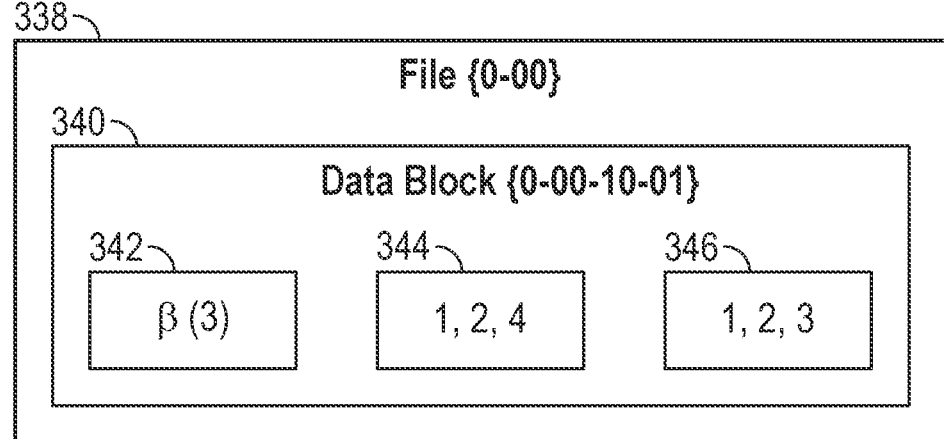
340
Data Block {0-00-10-01}
342     344     346
β (3)    1, 2, 4    1, 2, 3
348
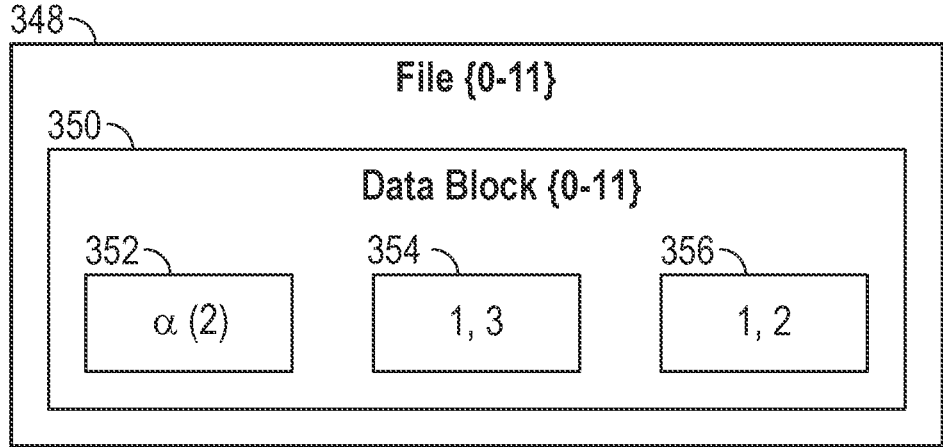
File {0-11}
350
Data Block {0-11}
352     354     356
α (2)    1, 3    1, 2
FIG.3D

COMPOSITE OPERATIONS USING MULTIPLE HIERARCHICAL DATA SPACES

PRIORITY

This application is a continuation of U.S. application Ser. No. 17/808,968, filed Jun. 24, 2022, now U.S. Pat. No. 11,740,788, and claims priority to U.S. Provisional Application Ser. No. 63/266,885, filed on Jan. 18, 2022, the contents of both of which are incorporated fully herein by reference.

BACKGROUND OF THE INVENTION

Field of the Disclosure

The present disclosure relates to information security, and more particularly to a system for performing composite operations using hierarchical data spaces.

BACKGROUND

Relational data management systems were designed and implemented to operate in the relational data model using either row or columnar approaches for organizing relations by the value of specified attributes, also known as columns. These systems organize and retrieve information by comparing or sorting values. Column-oriented approaches store the values of each column separately. When these columns are unsorted, the system must scan the entire column of values to perform an operation. Relational and non-relational data management systems perform operations by value for the attributes relevant to the operation.

SUMMARY OF THE INVENTION

Accordingly, embodiments of the invention are directed to a system and method for performing composite operations that substantially obviates one or more of the problems due to limitations and disadvantages of the related art.

In one aspect, a system for performing a composite operation includes a memory that stores instructions, and a processor that executes the instructions to perform operations. The operations may include choosing at least one primary logical hierarchical data space. The at least one primary logical hierarchical data space may have a plurality of subdivisions. The operations may further include determining at least one subdivision of the at least one primary logical hierarchical data space. The operations may further include choosing at least one secondary logical hierarchical data space. The at least one secondary logical hierarchical data space may have a plurality of subdivisions. The operations may further include determining at least one subdivision of the at least one secondary logical hierarchical data space. The operations may further include performing at least one operation corresponding to the at least one subdivision of the at least one primary logical hierarchical data space. The operations may further include performing at least one operation corresponding to the at least one subdivision of the at least one secondary logical hierarchical data space.

In another aspect, a method for performing a composite operation includes choosing, by utilizing instructions from a memory that are executed by a processor, at least one first primary logical hierarchical data space. The method may further include determining at least one subdivision of the at least one primary logical hierarchical data space. The at least one primary logical hierarchical data space may have a plurality of subdivisions. The method may further include choosing at least one secondary logical hierarchical data space. The at least one secondary logical hierarchical data space may have a plurality of subdivisions. The method may further include determining at least one subdivision of the at least one secondary logical hierarchical data space. The method may further include performing at least one operation corresponding to the at least one subdivision of the at least one primary logical hierarchical data space. The method may further include performing at least one operation corresponding to the at least one subdivision of the at least one secondary logical hierarchical data space.

In still another aspect, a computer readable device, which when loaded and executed by a processor, causes the processor to perform operations for performing a composite operation including choosing at least one primary logical hierarchical data space. The at least one primary logical hierarchical data space may have a plurality of subdivisions. The operations may further include determining at least one subdivision of the at least one primary logical hierarchical data space. The operations may further include choosing at least one secondary logical hierarchical data space. The at least one secondary logical hierarchical data space may have a plurality of subdivisions. The operations may further include determining at least one subdivision of the at least one secondary logical hierarchical data space. The operations may further include performing at least one operation corresponding to the at least one subdivision of the at least one primary logical hierarchical data space. The operations may further include performing at least one operation corresponding to the at least one subdivision of the at least one secondary logical hierarchical data space.

BRIEF DESCRIPTION OF THE DRAWINGS

The accompanying drawing, which is included to provide a further understanding of embodiments of the invention and are incorporated in and constitute a part of this specification, illustrate embodiments of the invention and together with the description serve to explain the principles of embodiments of the invention.

FIG. 1A shows the association of multiple, different logical hierarchical data spaces to the columns of a relational schema according to various embodiments;

FIG. 1B shows the association of physical and logical hierarchical data spaces with a relation according to various embodiments;

FIG. 1C shows a method of performing a composite operation using multiple hierarchical data spaces according to various embodiments;

FIG. 2B shows a method of performing a composite operation corresponding to at least one subdivision of a primary logical hierarchical data space, storing the results in a tertiary hierarchical data space, traversing the tertiary hierarchical data space to determine at least one subdivision of the secondary logical hierarchical data space, and then performing an operation corresponding to the at least one subdivision of the secondary logical hierarchical data space according to various embodiments;

FIG. 3C shows two relations with values and hierarchical path identifiers for two columns according to various embodiments;

FIG. 3D shows tuples stored in multiple files, data blocks, and sub data blocks corresponding to the subdivisions of a hierarchical data space according to various embodiments;

DETAILED DESCRIPTION OF THE PREFERRED EMBODIMENTS

Figure 2A:
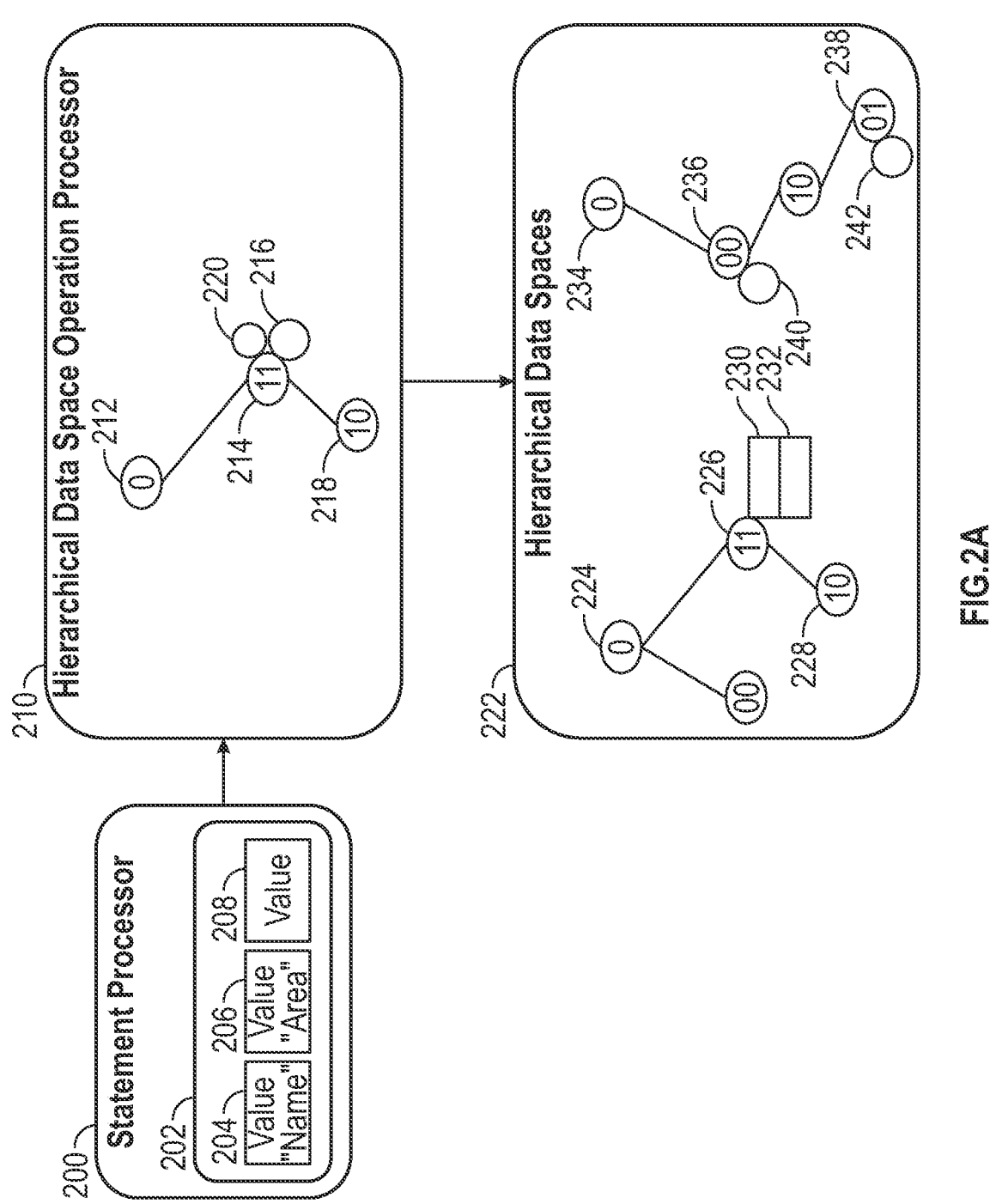
FIG. 2A shows a system for performing a composite operation using a plurality of hierarchical data spaces according to various embodiments.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete and will fully convey the concept of the invention to those skilled in the art.

Data, data value, or value is any sequence of one or more symbols. A data value or value may have an associated data type. A tuple is a sequence of one or more data values. A tuple may be an ordered sequence of one or more data values. A tuple may be an unordered sequence of one or more data values. A tuple is also a data value. As such, tuples may contain other tuples. Various methods of organizing the data values in a tuple are contemplated including, but not limited to, a sequence of one or more data values, ordered sequences of data values, unordered sequences of data values, individual key values, key/value pairs, records, elements, a data structure, a collection such as a list or map, structures, unions, self-describing records, an XML document or element, a JSON key/value pair, or a JSON list. A relation, or table, is a set of tuples where the value of each attribute, or column, of the tuple is a member of a data domain. Data values are vulnerable when they are not encrypted or when they are encrypted and co-located with the encryption keys that can decrypt them.

A file is a collection of data stored on a computer storage device. The computer storage device may be volatile or non-volatile. There are various computer storage devices including, but not limited to, random access memory (RAM), read-only memory (ROM), magnetic storage devices, flash memory devices, optical storage devices, cloud storage services, virtual storage. A file is typically accessible to a computer program executing on a computing device as a one-dimensional array of contiguous bytes. Although bytes are typically used, different data types may be used, such as a one-dimensional array of contiguous 32-bit or 64-bit words.

The one-dimensional array of contiguous bytes may be stored in a computer storage device as non-contiguous bytes. The computer storage device, file system, operating system, or other software may translate the non-contiguous bytes in storage so that a computer program executing on a computing device may access it as a one-dimensional array of contiguous bytes. A file may have an associated identifier so that the collection of data can be found in the computer storage device using the identifier. This identifier may be a pointer to a memory location of the computer storage device or a name that the computer storage device, file system, operating system, or other software uses to find the underlying bytes. The identifier may also include a path. A file may have associated metadata. There are many ways to organize information by file identifier and path.

A data block is a contiguous subset of bytes in a file or a message. A data block may be fixed or variable length. Since a file may be stored or a message transmitted as non-contiguous bytes, a data block may also be stored or transmitted as non-contiguous bytes and translated to appear as contiguous bytes. For example, a file system may store a file in a set of non-contiguous fixed sized blocks and then translate the contents so that the data in the file can be accessed by its position in a contiguous set of bytes. In another example, a message may be split into a set of packets in the underlying communications network, but the sender provides the data for the message as a contiguous set of bytes and the receiver translates the message back into a contiguous set of bytes.

A logical hierarchical data space (LHDS) is a space that is divided into a plurality of subdivisions. Each subdivision is recursively subdivided into child subdivisions and so on until a maximum depth is reached. A parent subdivision is any subdivision that is part of another subdivision's path to the root subdivision. A subdivision is a child of another subdivision if that other subdivision is a parent subdivision. A child subdivision is an immediate child subdivision of a parent subdivision if the parent subdivision has depth that is one less than the child subdivision. Together, immediate child subdivisions must fill all the space of their parent subdivision. Immediate child subdivisions of a subdivision may not overlap each other. Child subdivisions may not extend beyond their parent subdivision's space. These properties are required. A common subdivision of two or more subdivisions is a subdivision that is a parent of each. There may be multiple common subdivisions for two or more subdivisions. There must be at least one common subdivision for any two or more subdivisions because all subdivisions are children of the root subdivision. A deepest common subdivision is the deepest common subdivision of two or more subdivisions. If one of the subdivisions is a parent of the other subdivision, then it will be the deepest common subdivision. Two or more subdivisions will always have exactly one deepest common subdivision. It may be the root subdivision.

Data values are projected onto the LHDS so that the path through the subdivisions holding the value can be identified. This path is called a hierarchical path identifier (HPId). An HPId identifies a path to a subdivision in a hierarchical data space. An HPId explicitly specifies the depth of the subdivision being identified or implicitly specifies the depth based on the length of the path specified by the hierarchical path identifier. The projection of a data value must be consistent so that the same data value always projects to the same subdivision at the same depth. The projection of a data value does not depend on previous data values projected onto the space or stored in the space. The boundaries of each subdivision are fixed. Because a hierarchical data space preserves the hierarchy of its subdivisions, an HPId identifies a subdivision and any parent subdivisions to the root of the data space. Hierarchical path identifiers and data values may be encrypted in ways that minimize the information an intruder can learn about the data being stored. Hierarchical path identifiers, even when encrypted, must preserve the hierarchy of its subdivisions for operations using the hierarchical data space to function properly.

A hierarchical data space block (HDSB) is a data block that is associated with at least one subdivision of at least one logical hierarchical data space. A hierarchical data space block may be associated with subdivisions from multiple logical hierarchical data spaces. A hierarchical data space block may include child data blocks. It may also include data or metadata.

An LHDS is described by a hierarchical data space definition. In one embodiment, the hierarchical data space definition comprises the function and parameters that map a data value for a specific data type to a subdivision of a hierarchical data space. There are many different mapping functions, combinations of functions, and parameters that may be used. The parameters of the hierarchical data space definition modify how the function maps a data value to the subdivisions of the hierarchical data space. For example, the domain of 32-bit integers is −2,147,483,648 to 2,147,483,648, but the range of integer values expected in a column such as the Age column in schema 100 may be 0 to 125. Mapping the smaller range to the entire space may make queries against the hierarchical data space more selective. Once generated, hierarchical path identifiers may be used independently in hierarchical data spaces without the data value and the hierarchical data space definition used to generate them. This allows the execution of probabilistic operations using hierarchical data spaces on untrusted computers without exposing sensitive data values or the hierarchical data space definition used to project data values into the hierarchical data space.

An HPId can be used to find the subdivision in the hierarchical data space as well as the path through a hierarchical data structure representing the hierarchical data space. As used herein, a "physical hierarchical data space" refers to an instantiation of a structure that maintains the hierarchical relationship between the subdivisions of one or more logical hierarchical data spaces.

By preserving hierarchy, hierarchical data spaces can efficiently support probabilistic bounding, range, multi-dimensional, intersection, prefix, exact match queries, and other operations using hierarchical path identifiers without comparing any values. Hierarchical data spaces support range query by preserving hierarchy instead of preserving order. Hierarchical data spaces have no inherent notion of order. This may reduce inference data security risk.

An encrypted HPId is an HPId that has been encrypted by applying secret permutations to each subdivision's set of immediate child subdivisions. This reduces the probability that an attacker without the secret key can determine the original subdivision of space each portion of the hierarchical path points to. For those data types with a notion of order, these secret permutations can eliminate ordering. This may also reduce inference risk. The hierarchy of the subdivisions must be preserved throughout the encryption process so that encrypted probabilistic operations can still function properly.

Encrypted hierarchical path identifiers allow operations to be split between initial probabilistic execution using encrypted hierarchical path identifiers performed on untrusted computers and execution by value performed on trusted computers. The amount of data to be decrypted and the amount of execution by value is related to how effective the probabilistic execution is on the untrusted computers.

The attributes of each tuple may also be associated with one or more different logical hierarchical data spaces. An operation that wishes to act on a specific attribute of the tuple can probabilistically evaluate the hierarchical path identifiers for that attribute prior to or without evaluating the value of the attribute itself. This probabilistic evaluation using different logical hierarchical data spaces is essentially an intersection or AND operation on the results of evaluating an operation against a tuple in each hierarchical data space. If the operation's HPId for a given hierarchical data space does not match the tuple's HPId for that hierarchical data space, then the tuple does not match. If the hierarchical path identifiers do match, then the tuple may be a match for the operation. In this context, match does not necessarily mean that the hierarchical path identifiers identify the exact same subdivision. For many operations, they may match if one HPId identifies a parent subdivision of the subdivision identified by the other HPId or vice versa.

A primary LHDS is simply a hierarchical data space that is chosen as primary for a given operation. A secondary LHDS is simply a hierarchical data space chosen as secondary for a given operation. The at least one operation performed corresponding to at least one subdivision of the primary LHDS either happens before the at least one operation is performed corresponding to at least one subdivision of a secondary logical hierarchical data space, or the operations are performed together. There may be multiple different primary logical hierarchical data spaces and there may be multiple different secondary logical hierarchical data spaces.

Composite operations are comprised of at least one operation corresponding to at least one subdivision of at least one primary LHDS and at least one operation corresponding to at least one subdivision of at least one secondary logical hierarchical data space. Each operation can be performed probabilistically using one or more hierarchical data spaces. Composite operations may be formed by choosing at least one primary logical hierarchical data space, choosing a way to determine which subdivisions of the at least one primary LHDS to perform the operation in, choosing at least one secondary logical hierarchical data space, choosing a way to determine which subdivisions of the at least one secondary LHDS to perform the operation in, creating a sub operation to perform in the primary logical hierarchical data space, and then creating a sub operation to perform in the secondary logical hierarchical data space. Composite operations can include additional sets of different hierarchical data spaces and operations on those data spaces.

To use hierarchical data spaces to store or transmit information, logical hierarchical data spaces need to be chosen or specified for a given operation. The operations may also need information about the data being stored.

A relational schema defines the structure of a table and a set of constraints and data types defined for the columns in the table. FIG. 1A shows a schema 100 that has five named columns. They are Name, BirthDate, Age, Salary, and Location. Name is from the domain of variable length characters (varchar). BirthDate is from the domain of datetime. Age is from the domain of integers. Salary is from the domain of real numbers (numeric). Location is from the geospatial domain.

Schema 100 also shows a schema for a table and the assignment of two logical hierarchical data spaces to each column. More than one LHDS definition may be associated with each column. Using multiple different LHDS definitions can improve the selectivity of a query or operation that uses hierarchical path identifiers to find probabilistic matches. Tuples that have a valid HPId for an operation's HPId for the same hierarchical data space are a candidate match. The probability they are a match increases with each additional hierarchical data space where the operation matches the candidate. If the candidate value's HPId is not valid for the operation's corresponding hierarchical path identifier, then the probability it is a match is zero. The hierarchical data spaces must have different subdivisions, or the use of multiple hierarchical data spaces will not increase the selectivity. Ensuring each hierarchical data space has different subdivisions may be accomplished by specifying different parameters or by using different hierarchical space definitions that inherently subdivide space differently.

Schema 100 defines the columns for a table. It specifies the column name, constraints, data type, and logical data spaces for each column. In at least one embodiment, three different logical hierarchical data spaces are associated with each column. Although schema 100 describes attributes for a relation, schema 100 could also have described the attributes found in other non-relational forms such as a JSON document. In addition to associating logical hierarchical data spaces to a column or attribute, other useful information can be specified in the schema.

The data type attribute specifies the domain for the column and optionally the length or the range of the data. The constraint column allows various constraints to be set for a given column. For example, a primary key constraint indicates that the column is part of the primary key for the default physical hierarchical data space.

FIG. 1B shows the assigned physical hierarchical data spaces for the relation defined by schema 100. The data for the relation can be stored in physical hierarchical data spaces using hierarchical path identifiers instead of in data structures that order records by value. A first LHDS and a second LHDS are specified for each physical hierarchical data space. Although a first and a second hierarchical logical data space are shown, additional different logical hierarchical data spaces can be used. They are described as a first and second to denote that the logical hierarchical data spaces are different, in that they use a different method of subdividing space, have different parameters that change how they subdivide space, and/or use a different function to map a data value to subdivision. The attributes of a schema comprising the physical hierarchical data spaces, columns, and logical hierarchical data spaces can be used to determine how to store the tuples in a hierarchical data space.

FIG. 1B could also describe the physical hierarchical data spaces for non-relational data such as JSON, image or video metadata, or XML and the attributes to use for extracting the values to generate hierarchical path identifiers.

FIG. 1C shows a method for performing a composite operation using a plurality of hierarchical data spaces. The steps of FIG. 1C can be performed in different orders and steps can be repeated one or more times. Different steps can be performed on different clients, servers, or devices distributed across a network. The individual steps themselves may be partitioned and performed in parallel on different clients, servers, or devices distributed across a network.

Various composite operations comprised of multiple sub operations performed on different sets of at least one LHDS are contemplated including, but not limited to, operations on a single relation or table, operations on multiple relations or tables, operations on a single non-relational data set, operations on multiple non-relational data sets, operations on a result set and one or more relations or tables, operations on an input data set and one or more relations or tables, operations on object stores, operations on a relations or tables in memory, operations on relations or tables in persistence storage, operations on relations or tables in columnar storage, operations on relations in external data management systems and one or more relations, or nested operations where the output of one operation is the input to another operation.

For example, a single table may have a set of three logical hierarchical data spaces for attribute A and a set of three logical hierarchical data spaces for attribute B. Attribute A may be organized in a physical hierarchical data space A and attribute B organized in a physical hierarchical data space B. The composite operation may be comprised of an operation performed in physical hierarchical data space A and an operation performed in physical hierarchical data space B.

Another example of a composite operation is a join operation across two tables with a common attribute A. Attribute A may be organized in a physical hierarchical data space A for the first table and a physical hierarchical data space A for the second table. The join operation may be comprised of an operation performed in physical hierarchical data space A for the first table and an operation performed in physical hierarchical data space A for the second table.

Various sub operations are contemplated including, but not limited to, mutations, deletes, queries, storage/retrieval, mathematical operations, execution of arbitrary algorithms or code, relational algebra, selection, projection, union, join, intersection, difference, relational calculus, graph operations, linear algebra, transformations, columnar operations, atomic commit, classification algorithms, machine learning algorithms, or statistical operators.

Although the method is described with at least one primary LHDS and at least one secondary LHDS, it can be extended by choosing additional sets of logical hierarchical data spaces, determining at least one subdivision in each additional set of logical hierarchical data spaces, and performing an operation corresponding to the at least one subdivision of each additional set of logical hierarchical data spaces.

A composite operation using a plurality of hierarchical data spaces may be comprised of one or more operations that correspond to the specified subdivisions of the applicable hierarchical data space. At least one operation is performed corresponding to at least one subdivision of the at least one primary LHDS. At least one operation corresponds to at least one subdivision of the at least one secondary LHDS. For example, multiple operations corresponding to the at least one subdivision of the at least one primary LHDS could be used to extract the hierarchical path identifiers needed to determine the at least one subdivision of the at least one secondary LHDS that contains the tuples to perform a final operation or set of operations upon. Once the at least one subdivision of the at least one secondary LHDS is determined, multiple operations can be performed such as retrieving the tuples and then performing an operation on each tuple.

In step 110, at least one primary LHDS is chosen for the operation. The LHDS that is selected as the at least one primary LHDS depends on the operation being performed and the relations or tables, result sets, or input data sets to be operated upon. The use of various numbers of different primary logical hierarchical data spaces is contemplated including, but not limited to one, two, or three. The preferred number of different primary logical hierarchical data spaces is three. Various ways of determining the at least one primary LHDS are contemplated including, but not limited to, specified in an operation, specified in a parameter, specified in the input data, specified in the schema for the table being operated upon, specified in hierarchical data space assignments for the table being operated upon, derived from the input data, hard coded, read from a property file, looked up in a map based on a value in the input data, extracted from a statement, selected from a set of hierarchical data spaces based on the attributed present in a statement or operation, selected using information in a schema based on a value or values extracted from a statement or operation, or selected by choosing a physical hierarchical data space and using its associated logical hierarchical data spaces.

In step 112, at least one subdivision of the at least one primary LHDS is determined. Various methods of determining at least one subdivision of the at least one primary LHDS are contemplated including, but are not limited to, determining at least one value and identifying at least one subdivision of the at least one primary LHDS that corresponds to the at least one value, using an HPId to identify the at least one subdivision, using an encrypted HPId that preserves the hierarchy of the at least one primary LHDS to identify the at least one subdivision, traversing at least one subdivision of the at least one primary logical hierarchical data space, traversing at least one subdivision of at least one tertiary hierarchical data space, coordinated traversal of two or more physical hierarchical data spaces that have corresponding logical hierarchical data spaces, coordinated traversal of the subdivisions of the at least one primary LHDS and the subdivisions of the at least one secondary LHDS, traversing an input data set stored in a physical hierarchical data space, retrieving a value from an input data set and generating an HPId that identifies the at least one subdivision, traversing an intermediate result set stored in a physical hierarchical data space, retrieving a value from a result set and generating an HPId that identifies the at least one subdivision, retrieving an HPId from a result set and using it to identify the at least one subdivision, or deriving an HPId from one or more other hierarchical path identifiers and using it to identify the at least one subdivision.

Various methods of determining at least one value are contemplated including, but are not limited to, extracting the at least one value from the input of an operation, extracting the value from a statement, extracting the at least one value from a tuple, extracting the at least one value from a record in a result set, extracting the at least one value from an ordered sequence of data values, or extracting the at least one value from an unordered sequence of data values using the attribute as a lookup key, receiving the at least one value as a parameter, retrieving the value from a service, deriving the value from one or more values, reading the at least one value from storage, reading the at least one value from configuration, reading the at least one value from a property file, extracting the value from a result set, looking up the value in a key/value data structure such as a map, reading the at least one value from a database table, extracting the value from a record, or extracting the value from a collection.

In step 114, at least one secondary LHDS is chosen. The hierarchical data space that is selected as the at least one secondary LHDS depends on the operation being performed and the relations or tables, result sets, or input data sets to be operated upon. The use of various numbers of different secondary logical hierarchical data spaces is contemplated including, but not limited to one, two, or three. The preferred number of different secondary logical hierarchical data spaces is three. Various ways of determining the at least one secondary LHDS are contemplated including, but not limited to, specified in an operation, specified in a parameter, specified in the input data, specified in the schema for the table being operated upon, specified in hierarchical data space assignments for the table being operated upon, derived from the input data, hard coded, read from a property file, looked up in a map based on a value in the input data, extracted from a statement, selected from a set of logical hierarchical data spaces based on the attributed present in a statement or operation, selected using information in a schema based on a value or values extracted from a statement or operation, or selected by choosing a physical hierarchical data space and using its associated logical hierarchical data spaces.

In step 116, at least one subdivision of the at least one secondary LHDS is determined. Various methods of determining at least one subdivision of the at least one secondary LHDS are contemplated including, but are not limited to, receiving the at least one subdivision from the at least one operation performed in the primary logical hierarchical data space, determining at least one value and identifying at least one subdivision of the at least one secondary LHDS that corresponds to the at least one value, using an HPId to identify the at least one subdivision, using an encrypted HPId that preserves the hierarchy of the at least one secondary LHDS to identify the at least one subdivision, traversing at least one subdivision of the at least one primary logical hierarchical data space, traversing at least one subdivision of the at least one secondary logical hierarchical data space, traversing at least one subdivision of at least one tertiary hierarchical data space, coordinated traversal of two or more physical hierarchical data spaces that have corresponding logical hierarchical data spaces, coordinated traversal of the subdivisions of the at least one primary LHDS and the subdivisions of the at least one secondary logical hierarchical data space, traversing an input data set stored in a physical hierarchical data space, retrieving a value from an input data set and generating an HPId that identifies the at least one subdivision, traversing an intermediate result set stored in a physical hierarchical data space, retrieving a value from a result set and generating an HPId that identifies the at least one subdivision, retrieving an HPId from a result set and using it to identify the at least one subdivision, or deriving an HPId from one or more other hierarchical path identifiers and using it to identify the at least one subdivision.

Step 118 performs at least one operation corresponding to the at least one subdivision of the at least one primary LHDS determined in step 112. The method an operation uses to access the at least one subdivision of the at least one primary LHDS depends on the instantiation of the structure of the hierarchical data space. If it is an in-memory data structure, the operation is performed in a memory space or object corresponding to the subdivision. If the data is stored in files that correspond to the subdivisions of the at least one primary logical hierarchical data space, then the file or files corresponding to at least one subdivision of the at least one primary LHDS will be accessed to perform the operation. If the files are comprised of data blocks that correspond to at least one subdivision of the at least one primary logical hierarchical data space, then the relevant data blocks will be accessed to perform the operation. If the data is transmitted as messages comprised of data blocks that correspond to at least one subdivision of the at least one primary logical hierarchical data space, then the relevant data blocks will be accessed to perform the operation.

Step 120 performs at least one operation corresponding to the at least one subdivision of the at least one secondary LHDS determined in step 116.

For operations with a single specified subdivision of the at least one primary LHDS and a single specified subdivision of the at least one secondary logical hierarchical data space, the operations can both simply be performed in the specified subdivision of their respective hierarchical data spaces. For example, an insert of a record could consist of inserting a record in a primary LHDS in a subdivision identified using an HPId generated from a primary key value. The insertion of a record could also include the insertion of the least one primary HPId in at least one subdivision of the at least one secondary logical hierarchical data space. The subdivision could be identified using a secondary HPId generated by a secondary key value.

Once tuples have been inserted in this manner, then a query operation using a secondary key value can be performed by flipping which LHDS is primary and which LHDS space is secondary. This query operation could identify the at least one subdivision of the at least one primary LHDS that corresponds to a key value to find the applicable hierarchical path identifiers that identify the at least one subdivision in the secondary LHDS where the relevant candidate tuples can be found. The query operation could then go retrieve the record(s) in the secondary logical hierarchical data space. In this case, step 116 uses the hierarchical path identifier(s) retrieved by the operation in the primary logical hierarchical data space. It becomes a parameter to the operation in the secondary LHDS to retrieve the final record(s).

An intermediate result set using a physical hierarchical data space could be used to efficiently hold the hierarchical path identifiers. In this case, the result set can be traversed by step 116 to select the at least one subdivision of the at least one secondary LHDS to perform the operation of step 120.

For more complex operations such as a relational join, the traversal of multiple hierarchical data spaces can be coordinated so that the operations in each hierarchical data space are performed in corresponding subdivisions at the same time. In this case, step 116 determines at least one subdivision of the at least one secondary LHDS based on the traversal of the secondary logical hierarchical data space. Some of the steps of method in FIG. 1C may be repeated multiple times depending on the operation being performed. In this case, step 116 and step 120 may be repeated for each subdivision of the secondary LHDS traversed. For instance, a join operation typically accesses tuples from multiple relations. By coordinating so that the operations retrieve tuples from corresponding subdivisions of their respective hierarchical data spaces, significant performance efficiencies can be gained because in some circumstances it can be guaranteed that only tuples from corresponding subdivisions can be join candidates. In these circumstances, traditional optimization techniques for joins such as hash joins and merge joins are unnecessary.

Another embodiment for performing an operation using a plurality of hierarchical data spaces is to store the tuples from multiple relations in a common data structure organized by LHDS. In this embodiment, coordinating the operations to act upon corresponding subdivisions is simple because each node of the data structure holds corresponding subdivisions from multiple logical hierarchical data spaces. Coordinating the operations for the primary LHDS and the operations for the secondary LHDS so that they are performed on corresponding subdivisions simply requires traversing the common data structure. The operations are then performed on the tuples of their respective hierarchical data space.

The ability to control which subdivisions the composite operation's sub operations act upon allows complex operations such as joins in relational algebra to be efficiently performed probabilistically prior to being performed by value. The method of performing operations using a plurality of logical hierarchical data spaces allows complex operations to be performed using a probabilistic phase and a final evaluation phase, substantially obviating one or more of the problems due to limitations and disadvantages of the related art. Because operations can be performed probabilistically using hierarchical path identifiers before the data is evaluated by value, the operations can be performed on encrypted records without decrypting them until final evaluation. Probabilistic evaluation using hierarchical path identifiers can be performed on untrusted computers to filter the candidate result set while final evaluation is performed on trusted computers where the encryption keys can be kept safe. Probabilistic evaluation can significantly filter the candidate result set for final evaluation, potentially providing significant performance gains for both encrypted and unencrypted operations.

A result set may be organized using logical hierarchical data spaces. A result set may be stored as one or more files that correspond to at least one subdivision of at least one logical hierarchical data space. Those files may be comprised of data blocks wherein each data block corresponds to at least one subdivision of the at least one logical hierarchical data space. A result set may be transmitted in a message comprised of data blocks wherein each data block corresponds to at least one subdivision of at least one logical hierarchical data space. By organizing results using logical hierarchical data spaces, the results may be efficiently operated upon using hierarchical data space operations.

To further describe the method of FIG. 1C, several example operations are now described. The first example is a mutation operation comprised of an operation that stores a primary tuple in a primary LHDS organized using the "Name" attribute and an operation that stores a secondary tuple in a secondary LHDS organized using the "Area" attribute. The secondary tuple is comprised of a reference to the primary tuple using a hierarchical path identifier. This composite operation can be performed atomically, so that either both tuples are stored or neither tuple is stored on failure.

Tuple 104 contains the incoming data for the mutation. This tuple could be received from another computer, device, or client. It could also be created on the same computer or device. It could be created by parsing a statement in SQL or another language.

Schema 106 describes the attributes that are present in tuple 104. Hierarchical data space assignments 108 specify the logical hierarchical data spaces for each attribute. FIG. 1B describes the physical hierarchical data spaces associated with the relation.

Step 110 must choose at least one primary LHDS to use in performing the at least one operation. For example, FIG. 1B shows two physical data spaces. Physical hierarchical data space A uses the "Name" field as its key attribute. For storing the primary tuple, the schema may specify physical data space A. Therefore, physical data space A would be used as the first primary logical hierarchical data space. Physical hierarchical data space A also has two logical hierarchical data spaces associated with it. Those logical hierarchical data spaces may be chosen as the first and second primary logical hierarchical data spaces. Multiple, different primary logical hierarchical data spaces may be used to execute the hierarchical data space operations more efficiently.

The schema may specify that physical hierarchical data space B stores a reference to the subdivision in physical hierarchical data space A for tuples that have a given value. Physical hierarchical data space B uses the "Area" attribute as its key attribute. Physical data space B would be used as the first secondary logical hierarchical data space. The primary tuple is stored in a subdivision of physical data space A based on the primary hierarchical path identifier. Physical hierarchical data space B also has two logical hierarchical data spaces associated with it. Those logical hierarchical data spaces may be chosen as the second and third secondary logical hierarchical data spaces.

Step 112 determines at least one subdivision of the at least one primary logical hierarchical data space. One way it may do this is to use at least one value and determine the at least one subdivision that corresponds to the at least one value. This value may be the value of the key attribute specified in FIG. 1B. For instance, the value for "Name" in tuple 104 would be used. The tuple would then be stored in physical hierarchical data space A in the subdivision that corresponds to the "Name" value. Determining which value to use may be based on the schema and the statement for the operation being executed. The function and parameters that map a value of a specific data type to a subdivision of a hierarchical data space is provided with the hierarchical data space definition.

Step 114 chooses at least one secondary LHDS for the operation. For storing a reference to the primary tuple, the secondary logical hierarchical data spaces may be specified for physical hierarchical data space B as specified in FIG. 1B. Step 116 will determine at least one subdivision of the at least one secondary logical hierarchical data space. Since the operation is storing an HPId as a reference to the location of the tuple in the primary logical hierarchical data space, step 116 will choose a value for the "Area" attribute of tuple 104 and generate at least one HPId that identifies the at least one subdivision of the at least one secondary logical hierarchical data space. For some sets of operations, the primary and secondary logical hierarchical data spaces may be the same. For example, a primary operation may occur corresponding to a subdivision of the LHDS and the secondary operation may occur in a different subdivision of the same LHDS.

Step 118 will perform at least one operation corresponding to the at least one subdivision of the primary logical hierarchical data space. Various methods of performing at least one operation corresponding to a subdivision of a hierarchical data space are contemplated including, but not limited to, performing an operation in at least one subdivision of the at least one physical hierarchical data space, performing an operation in a memory region corresponding to the at least one subdivision of the at least one hierarchical data space, performing an operation in a file corresponding to the at least one subdivision of the at least one hierarchical data space, performing an operation in a file region corresponding to the at least one subdivision of the at least one hierarchical data space, or performing an operation on an object corresponding to the at least one subdivision of the at least one hierarchical data space, performing an operation in a collection corresponding to the at least one subdivision of the at least one hierarchical data space, or performing an operation in a data container corresponding to the at least one subdivision of the at least one hierarchical data space.

For the operation storing a primary tuple, the operation will store the tuple corresponding to the at least one subdivision for the at least one primary logical hierarchical data space.

The at least one operation corresponding to the at least one subdivision of the at least one primary LHDS and the at least one operation corresponding to the at least one subdivision of the at least one secondary LHDS can be performed using a method that ensures that all the operations either succeed or all the operations are aborted. For instance, if the mutation that stores multiple tuples in different hierarchical data spaces only partially succeeds, then the results of a query that uses one attribute to find a reference tuple that identifies the subdivision containing the other tuple will be invalid. Either the reference tuple will be missing or the full tuple the reference tuple points will be missing. This is called atomicity and is part of a set of desirable transactional properties of atomic, consistent, isolated, and durable. This is known as ACID. Atomicity may be achieved by using a protocol such as two-phase commit, three-phase commit, atomic commit, or a transaction monitor.

Step 120 will perform at least one operation corresponding to at least one subdivision of the secondary logical hierarchical data space. For the operation storing a primary tuple and a secondary tuple pointing to the primary tuple, the operation will store the secondary tuple in a subdivision of the secondary LHDS using the at least one secondary hierarchical path identifier.

For some operation types, operation may also be performed in the corresponding subdivision's child subdivisions or parent subdivisions. Various operations are contemplated including, but not limited to, mutations, deletes, queries, storage/retrieval, mathematical operations, execution of arbitrary algorithms or code, relational algebra, selection, projection, union, join, intersection, difference, merges, relational calculus, graph operations, linear algebra, transformations, columnar operations, two-phase commit, three-phase commit, atomic commit, or statistical operators.

An example operation using primary logical hierarchical data spaces and secondary logical hierarchical data spaces is comprised of finding tuples using a specified value for "Area" and then retrieving the tuples that are in that "Area." In this case, the primary and secondary logical hierarchical data spaces are swapped from the mutation example. Step 110 will choose as the at least one primary LHDS the hierarchical data spaces that contains the tuples comprised of hierarchical path identifiers that point to the subdivisions in the other hierarchical data space that contain the full tuples. These are the hierarchical data spaces used for the physical hierarchical data space B, which are also the secondary logical hierarchical data spaces in the previous example. Step 112 will determine at least one subdivision of the at least one primary LHDS by identifying the subdivision that corresponds to the value of the "Area" attribute in tuple 104. Step 114 will choose at least one secondary logical hierarchical data space. These will be the hierarchical data spaces storing the full tuple. In the previous example, these were the primary logical hierarchical data spaces. Step 118 will perform the operation corresponding to the at least one subdivision of the primary LHDS determined in step 112. Step 118 will determine the at least one subdivision in the at least one secondary LHDS by extracting at least one HPId from the tuple retrieved in step 120. The at least one hierarchical path identifiers will identify the at least one subdivision for each of the secondary logical hierarchical data spaces. For many operations using a plurality of hierarchical data spaces, the operation of step 118 will be used to determine at least one secondary HPId which is then used to execute the operation in step 120. Step 120 will then find the tuples in the at least one secondary LHDS using the at least one subdivision determined in step 116. The operation in step 120 may evaluate the tuples in one or more secondary logical hierarchical data spaces to probabilistically filter the candidate tuples. Once this is completed, the candidate results can be evaluated by value.

The examples show that the method of FIG. 1C can be used to perform both mutation and query operations using multiple sets of different hierarchical data spaces. These operations can be performed using hierarchical path identifiers without operating by value. The ability to perform operations using a plurality of hierarchical data spaces without or before operating by value can improve the efficiency and can improve the security of many data management operations. This allows complex operations to be performed using encrypted hierarchical path identifiers without exposing the plaintext value or decrypting the plaintext value until the results are evaluated.

FIG. 2A shows a system using the method shown in FIG. 1C for performing operations using a plurality of logical hierarchical data spaces. Statement processor 200 transforms and analyzes the given statement 202 to determine the primary and secondary logical hierarchical data spaces, the subdivisions of the primary logical hierarchical data space, and the operations to perform in the subdivisions. Depending on the operation described by statement 202, the statement processor may extract the values associated with attributes of the relation or relations the statement refers to. It may then generate the hierarchical path identifiers to identify the subdivisions of the primary logical hierarchical data spaces or secondary logical hierarchical data spaces.

Hierarchical data space operation processor 210 then executes the operation using a plurality of physical hierarchical data spaces 222 comprised of one or more LHDS. Depending on the operation, the results may be collected in tertiary hierarchical data space 212. A hierarchical data space is used so that coordinated traversal of the results and the at least one secondary LHDS can be used to efficiently determine which subdivisions of the at least one secondary LHDS to operate in. The results can also be organized in other ways, such as in lists or maps.

The following describes how the mutation example for the method of FIG. 1C is performed by the system of FIG. 2A. Statement processor 200 transforms the insert statement 202 with values 204, 206, and 208 into an operation using a plurality of hierarchical data spaces. It will choose, as the primary LHDS, the LHDS associated with the "Name" attribute. This is also the hierarchical data space 224 shown in hierarchical data spaces 222. The statement processor will choose as the secondary logical hierarchical data spaces those hierarchical data spaces associated with the "Area" attribute. This is also the hierarchical data space 234 in hierarchical data spaces 222. The statement processor will generate the primary HPId {0-11} for the value 204 in statement 202 that corresponds to the "Name" attribute as specified for physical hierarchical data space A in FIG. 1B. The statement processor will also generate a tuple 240 comprising the generated primary HPId {0-11}. The statement processor will then generate the secondary HPId {0-00} for the value 206 in statement 202 that corresponds to the "Area" attribute as specified for physical hierarchical data space B in FIG. 1B. The tuple 230 will be stored by the operation in the subdivision 226 of primary LHDS 224. The secondary tuple 240 will be stored by an operation in subdivision 236 of the secondary LHDS 234. This mutation operation can be repeated for additional statements with different values for "Name" and "Area." In this example those additional mutations result in additional tuples 232 and tuple 242 containing HPId {0-11}.

FIG. 2B shows a method of gathering results from an operation in a primary LHDS in a result set using a tertiary hierarchical data space, traversing the tertiary hierarchical data space to determine a subdivision for the secondary logical hierarchical data space, and then performing an operation in the subdivision of the secondary logical hierarchical data space.

The following will describe one way to use the method of FIG. 1C and the method of FIG. 2B to perform a query that involves multiple hierarchical data spaces. In this example statement 202 is a query statement. Statement processor 202 will transform query statement 202 with values 204, 206, and 208 into an operation using a plurality of hierarchical data spaces. First, it will retrieve tuples from hierarchical data space 234 by "Area" and then use the hierarchical path identifiers in those tuples to search for the tuples in hierarchical data space 224 that have a matching "Area" attribute.

The statement processor will generate an HPId {0-00} for the "Area" value 206 in statement 202. Hierarchical data space operation processor 210 will perform an operation to retrieve the tuples stored in the identified subdivision and any child subdivisions recursively. Subdivisions are included recursively because "Area" is a geospatial data type that can contain other areas. Step 244 will store tuple 240 in the tertiary hierarchical data space 212 in the subdivision 214 identified by the HPId {0-11} that was stored in tuple 240. Step 244 will also store tuple 242 in the tertiary hierarchical data space 212 in the subdivision 214 identified by the HPId {0-11} that was stored in tuple 242. Tuple 240 will be stored as tuple 220 and tuple 242 will be stored as tuple 216 in subdivision 214.

If multiple tuples point to the same subdivision 226 {0-11} in the secondary logical hierarchical data space, sometimes only one of the tuples is kept in the tertiary hierarchical data space. By using a tertiary hierarchical data space, determining if an existing result tuple points to the same subdivision is as simple as checking the subdivision before inserting the result tuple. In some cases, this can save space in the result set. In other embodiments, the tuple stored in the result may also specify the sequence number of a specific tuple. In these cases, the sequence numbers contained in each tuple would need to be kept in the result set if they were different. However, they can still be efficiently deduplicated to save space and computation when traversing the result set.

In step 246, hierarchical data space operation processor 210 will traverse the subdivisions of the tertiary hierarchical data space 212. Because the result set 210 has the same LHDS as LHDS 224, the subdivisions present in both can be traversed concurrently. This is significantly more efficient than iterating through each value in the result set and searching the hierarchical data space for each tuple in the result set.

When a subdivision containing tuples is found during traversal, Step 248 will extract the HPId {0-11} to identify at least one subdivision of the secondary logical hierarchical data space. Step 250 will perform an operation on tuple 230 and tuple 232 in the subdivision 226 corresponding to HPId {0-11}. For a query operation, these two candidate tuples will eventually be evaluated by value to determine if they actually have an "Area" that matches the "Area" value in value 206.

Figure 3A:
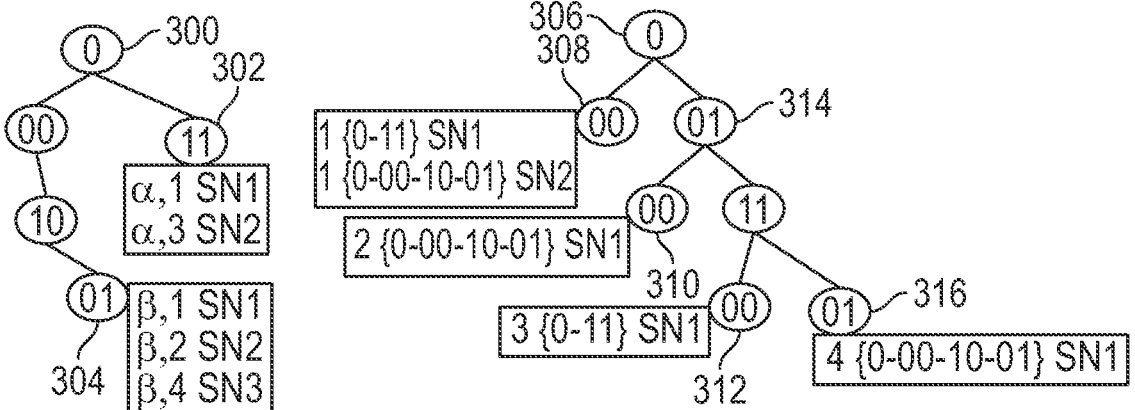
FIG. 3A shows tuples organized in hierarchical data spaces according to various embodiments.

FIG. 3A shows tuples organized in hierarchical data spaces. Physical hierarchical data space 300 contains a set of tuples from relation 334 and relation 336. Tuple (α,1) is located subdivision 302 {0-11} because data value α corresponds to subdivision {0-11} of the logical hierarchical data space. Tuple (α,3) is also located in subdivision 302 {0-11} because data value α corresponds to subdivision {0-11}. The value of α is projected into a hierarchical data space in subdivision 302 {0-11}. Tuple (β,1) is in subdivision 304 {0-00-10-01} because data value β corresponds to subdivision {0-11}. The value β is projected into the hierarchical data space in subdivision 304 {0-00-10-01}. Tuple (β,2) and tuple (β,4) are also located in subdivision 304 {0-00-10-01}. Each data attribute for a relation can be kept in each tuple.

Physical hierarchical data space 306 contains tuples from relation 334 and relation 336. These tuples are placed in the subdivisions for the hierarchical path identifiers for the value of column B. These tuples point to the subdivisions in physical hierarchical data space 300 that contain the tuples for each relation. This allows the hierarchical path identifiers for the values in column B to be used to find the tuples for the row. To find the tuples where the column B value is 3 with HPId {0-01-11-00}, the tuples stored in subdivision 312 {0-01-11-00} are accessed. Tuple (3, {0-11}) is found. This tuple points to the subdivision 302 {0-11} of physical hierarchical data space 300. The tuples present there are (α,1) and (α,3). The tuples can then be evaluated to see if its column B value matches 3. Tuple (α,3) matches, and it is therefore the result. This method allows multiple physical hierarchical data spaces to be used to store and probabilistically query relationships between the attributes of a relation.

Figure 3B:
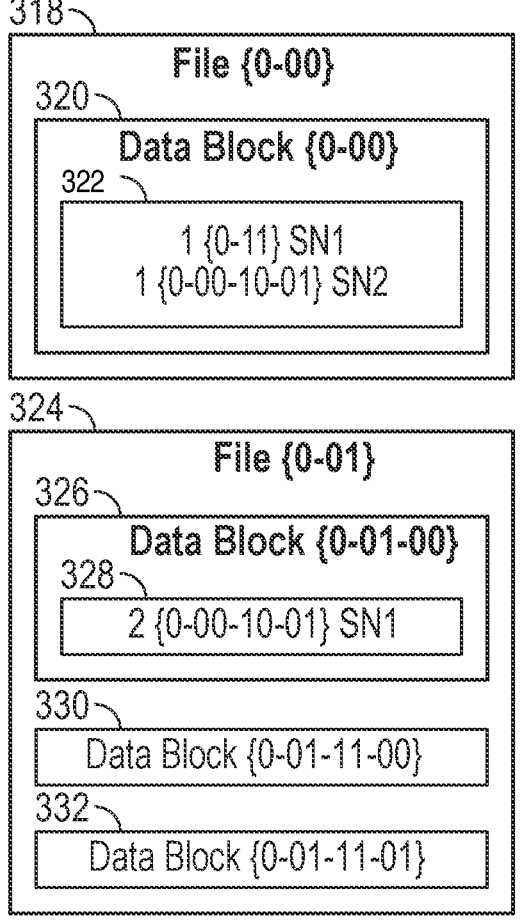
FIG. 3B shows information stored in one or more files and data blocks corresponding to at least one subdivision of at least one logical hierarchical data space using hierarchical data spaces according to various embodiments.

FIG. 3B shows information stored in one or more files and data blocks corresponding to at least one subdivision of at least one LHDS using hierarchical data spaces. The tuples from physical hierarchical data space 306 are stored in a set of files and data blocks. File 318 and File 324 store correspond to different subdivisions of the hierarchical data space. File 318 contains a data block 320 {0-00} which corresponds to subdivision {0-00}. Data block 320 stores the tuples (1, {0-11}) and (1, {0-00-10-01}) from subdivision 308. These tuples are stored in a subblock 322 of region 318. File 324 stores subdivision 314 {0-01}. Data block 326 contains tuple 328 from subdivision 310. Various embodiments for arranging the data blocks in a file are contemplated, but not limited to, storing all the data blocks at the same level of the file, or arranging the data blocks in the file in a way that preserves the hierarchy of a hierarchical data space. Storing the data blocks while preserving the hierarchy of a hierarchical data space provides for more efficient input/output when searching for tuples in specific subdivisions. This also allows for subdivisions with a minimum number of tuples to be aggregated in parent subdivisions. Data block 330 {0-01-11-00} and data block 332 {0-01-11-01} are shown in FIG. 3B arranged in a flat arrangement.

FIG. 3C shows two relations with values and hierarchical path identifiers for two columns. FIG. 3D shows tuples from relation 334 and relation 336 stored in multiple files, data blocks, and subblocks corresponding to the subdivisions of a hierarchical data space. File 338 {0-00} contains a region 340 {0-00-10-01). Instead of all the attributes of the tuples being stored together like they are in subblock 322, the attributes of the tuples from subdivision 304 are shredded and stored as a column of values. For instance, subblock 342 holds the value β for tuples (β,1), (β,2), and (β,4). Subblock 344 holds the values 1, 2, 4 for (β,1), (β,2), and (β,4). Subblock 346 holds sequence numbers assigned to the tuples (β,1), (β,2), and (β,4). The reason for shredding them into different lists of values is that grouping values together that have the same data type allows them to be more efficiently compressed. Subblock 342 can use run length compression to store the value β once for three tuples. File 348 {0-11} contains tuples corresponding to subdivision 302. These tuples are stored in region 350. The tuples are split by attribute in subblock 352 and subblock 354 and subblock

356. By shredding the tuples by attribute into multiple subblocks, operations that access specific attributes can avoid the input/output cost of loading subblocks for irrelevant attributes. The sequence numbers for the tuples are stored in subblock 356. Sequence numbers may be assigned to tuples corresponding to a subdivision of the at least one logical hierarchical data space. Sequence numbers corresponding to a subdivision are independent from every other subdivision. In other words, sequence numbers are not unique across subdivisions, but they are unique for a subdivision. By assigning sequence numbers, each tuple can be identified by its corresponding subdivision in each LHDS and by the sequence number.

A benefit of using hierarchical data spaces to organize information is that it is highly likely that information stored together in a subdivision is similar. The tuples may have the same value for the attribute used to generate their hierarchical path identifier. Values of other attributes of each tuple may also be highly likely to be similar in value or range. Values that are similar or have the same data type and are in a limited range can be compressed very efficiently. For example, in subblock 342, β (3) denotes the value β repeats 3 times. This run-length compression can substantially reduce the amount of storage required.

Tuples in the same subdivision can be sorted by multiple attributes to further improve compression ratio. Once tuples are grouped in this way by a subdivision of their at least one logical hierarchical data space, sorting the tuples of a single subdivision is much more efficient than sorting the complete set of tuples.

Figure 4A:
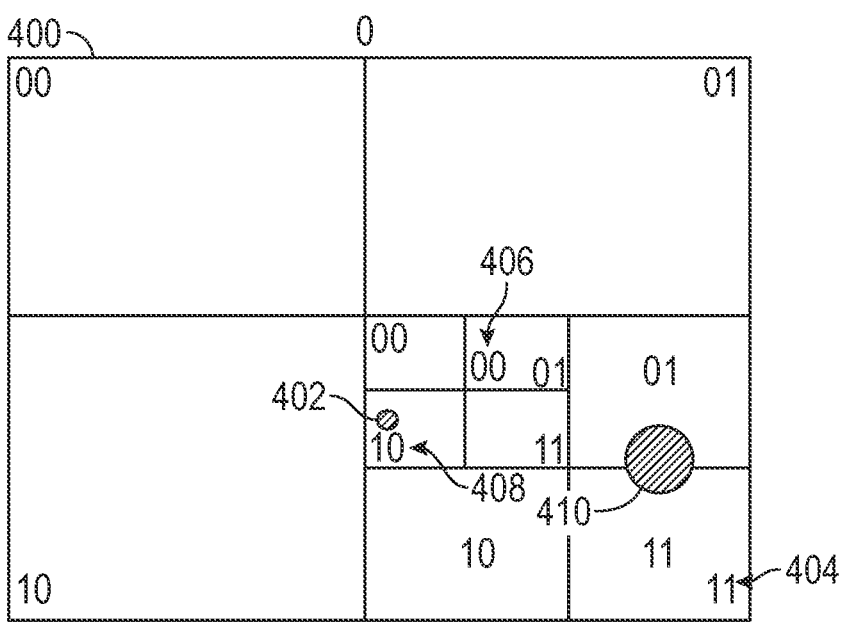
FIG. 4A shows a subset of hierarchical subdivisions for a hierarchical data space and values corresponding to various subdivisions of the hierarchical data space according to various embodiments.
Figure 4B:
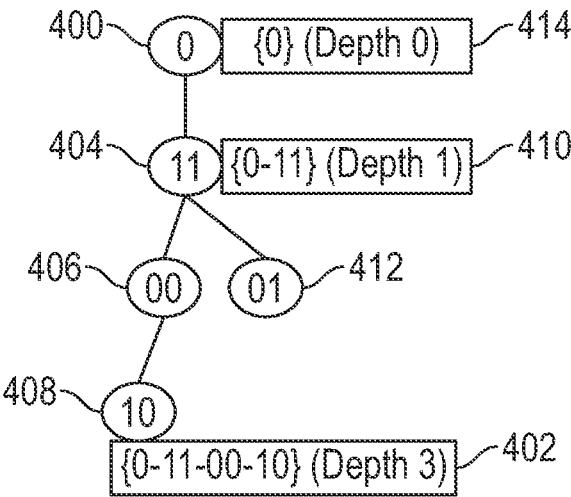
FIG. 4B shows a physical hierarchical data space containing tuples with values corresponding to the various subdivisions of the logical hierarchical data space of FIG. 4A according to various embodiments.
Figure 5A:
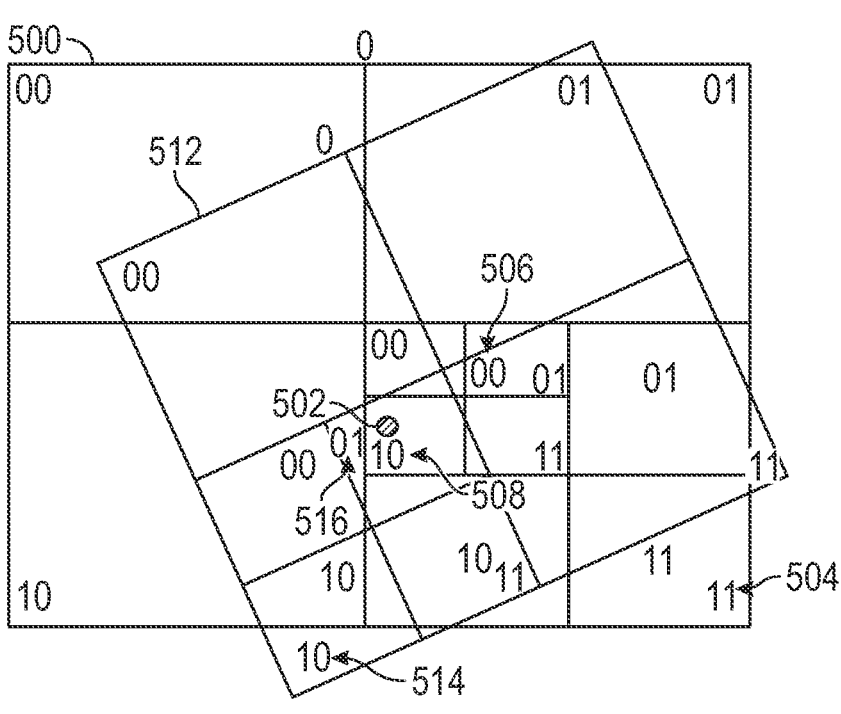
FIG. 5A shows a subset of hierarchical subdivisions for two different hierarchical data spaces and values corresponding to various subdivisions of the hierarchical data spaces according to various embodiments.
Figure 5B:
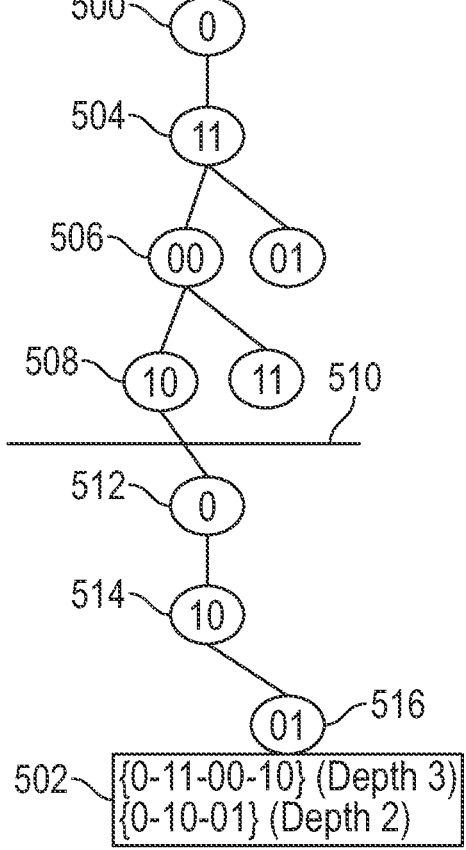
FIG. 5B shows a physical hierarchical data space containing tuples with values corresponding to the various subdivisions of two different logical hierarchical data spaces of FIG. 5A according to various embodiments.

There are many ways to decompose a data space for a data type into a hierarchy of subdivisions so that the subdivision for a value can be identified. It is important that the hierarchy of the subdivisions is preserved and the path through the subdivisions can be encoded in a hierarchical path identifier. FIG. 4A and FIG. 4B describe an embodiment for generating an HPId for a data value in a single hierarchical data space. FIG. 5A and FIG. 5B describe how to generate two hierarchical path identifiers, one for each hierarchical data space.

FIG. 4A shows a subset of hierarchical subdivisions for a hierarchical data space and values corresponding to various subdivisions of the hierarchical data space. In various embodiments, the method may be used with hierarchical data spaces that include one or more dimensions. In the illustrated embodiment, the hierarchical data space has two dimensions. The initial data space 400 is subdivided into four quadrants. Since data value 402 is in subdivision 404 {11} of data space 400, the label {11} is appended to the initial data space's HPId {0} depth 0, resulting in HPId {0-11} with depth 1. Depth indicates the number of steps from the root of the data space that the HPId includes. Depth can also be viewed as the number of subdivisions from the root of the data space. For instance, in the illustrated embodiment, depth 1 indicates that the HPId includes one step from the root or the first subdivision. Depth 10 would indicate that the HPId represents a path with 10 steps or 10 subdivisions from the root. Since data value 402 is located in subdivision 404 {11} of initial data space 400, subdivision 404 {11} of data space 400 is chosen to be subdivided. Since data value 402 is in subdivision 406 {00} of subdivision 404, {00} is appended to the hierarchical path identifier, resulting in path {0-11-00} with depth 2. The next subdivision containing data value 402 is subdivision 408 {10}, resulting in path {0-11-00-10} with depth 3. The recursive process may continue until the depth reaches the maximum depth or the data value is no longer contained in a single subdivision. Data values with size and shape may not reach the maximum depth while point values reach a maximum depth. The result is HPId shown in tuple 402.

Since the HPId may terminate before maximum depth is reached, there can be many subdivisions with greater depth beneath this hierarchical path identifier. Thus, in at least one embodiment, HPId {0-11-00-10} depth 3 shown in tuple 402 may be used to indicate an interest in the subdivision plus all its child subdivisions and all its parents all the way to the root.

FIG. 4A also shows a query 410 that crosses a boundary of two subdivisions. The HPId generated for query 410 would be {0-11} (Depth 2) because it is not fully contained in {0-11-01} or {0-11-11}. Therefore, all of node 404 {0-11} and its children would have to be accessed in any query.

FIG. 4B shows a physical hierarchical data space containing tuples with values corresponding to the various subdivisions of the LHDS of FIG. 4A. Node 400 corresponds to the root of the LHDS 400 {0} in FIG. 4A. Node 404 corresponds to subdivision 404 {0-11} in FIG. 4A. Node 406 corresponds to subdivision 406 {0-11-00}. Node 408 corresponds to subdivision 408 with path {0-11-00-10} in FIG. 4A. The calculated HPId {0-11-00-10} depth 3 describes the path to node 408 in the physical hierarchical data space. Since HPId {0-11-00-10} can also be used to indicate interest in node 408 and any of its children, hierarchical path identifiers can be used for performing certain types of queries such as range, bounding, and intersection queries. For instance, a query can go to the subdivision 404 {0-11} specified by the HPId and then evaluate all the data tuples in that subdivision and search all child subdivisions. The hierarchical nature of this method may be employed to provide that all values contained by 404 {0-11} are contained in its child subdivisions.

Because of the preservation of hierarchy in hierarchical data spaces, a container capable of holding or storing data that corresponds to subdivision {0-11-00-10} may hold or store data corresponding to subdivision {0-11-00-10} or any of its child subdivisions. It may not hold or store data for any other subdivisions. For example, a container that corresponds to subdivision {0-11-00-10} may not hold or store data with corresponding subdivision {0-11-00} or corresponding subdivision {0-11-00-11}.

A value that corresponds to a subdivision may be held or stored in that subdivision or in any of the subdivision's parent subdivisions. It may not be held or stored in the subdivision's children. Value 402 corresponds with subdivision {0-11-00-10}. It also corresponds with subdivision {0-11-00}, subdivision {0-11}, and subdivision {0}. Value 402 may not be stored or held in a container with that is a child of subdivision {0-11-00-10} because there is no way to know which child subdivision corresponds to the data value. {0-11-00-10} depth 3 does not specify any subdivisions past depth 3.

Value 414 corresponds with subdivision 400 {0} but does not correspond with subdivision 404 {0-11}. This is because the HPId does not specify any subdivisions past depth 0. Value 410 corresponds with subdivision 404 {0-11} and subdivision 400 {0}. Value 410 does not correspond with subdivision 406, subdivision 408, or subdivision 412.

FIG. 5A shows a subset of hierarchical subdivisions for two different hierarchical data spaces and values corresponding to various subdivisions of the hierarchical data spaces. Using multiple different logical hierarchical data spaces allows for more efficient queries of the contents of a physical hierarchical data space and more selective probabilistic filtering during those queries.

The initial LHDS 500 is subdivided into four quadrants. Since data value 502 is located in subdivision 504 {11} of data space 500, the label {11} is appended to the initial data space's HPId {0} depth 0, resulting in HPId {0-11} with depth 1. Since data value 502 is located in subdivision 506 {00}, {00} is appended to the hierarchical path identifier, resulting in path {0-11-00} with depth 2. The next subdivision containing data value 502 is 508 {10}, resulting in HPId 518 {0-11-00-10} with depth 3. If max depth is 3 or the data value was contained in multiple child subdivisions, the process would terminate.

The second LHDS 512 is different from the first LHDS 500. In the illustrated embodiment, LHDS 512 is scaled, translated, and rotated. Data value 502 has a different path through the subdivisions in LHDS 512 than in LHDS 500. To get improved selectivity through using multiple logical hierarchical data spaces, those logical hierarchical data spaces must be different.

The second LHDS 512 is subdivided into four quadrants. Since data value 502 is located in subdivision 514 {10} of data space 512, the label {10} is appended to the initial data space's HPId {0} depth 0, resulting in HPId {0-10} with depth 1. Since data value 502 is located in subdivision 516 {00}, {01} is appended to the hierarchical path identifier, resulting in path {0-10-01} with depth 2. If the tuple is contained in multiple child subdivisions or max depth is reached, the process stops.

FIG. 5B shows a physical hierarchical data space containing tuples with values corresponding to the various subdivisions of two different logical hierarchical data spaces shown in FIG. 5A. Node 500 corresponds to the root of the LHDS 500 {0} in FIG. 5A. Node 504 corresponds to subdivision 504 {0-11}. Node 506 corresponds to subdivision 506 {0-11-00} in FIG. 5A. Node 508 corresponds to subdivision 508 with path {0-11-00-10}. The calculated HPId {0-11-00-10} depth 3 describes the path to node 508 in the physical hierarchical data space. Node 508 is connected to a subtree or subgraph representing the subdivisions and hierarchy for a second hierarchical data space 512. This subtree has a node 512 {0} with a child node 514 {0-10} corresponding to subdivision 514. Node 514 has a child node 516 corresponding to subdivision 516. Node 514 has a tuple corresponding to data value 502. A tuple with hierarchical path identifiers corresponding to a data value with two different logical hierarchical data spaces can therefore be stored in a single physical hierarchical data space. The benefit is that there may be many tuples that have the same HPId {0-11-00-10} for the first LHDS but have different hierarchical path identifiers for the second logical hierarchical data space. By storing them in an attached subtree representing the subdivisions of the second logical hierarchical data space, the tuples are more distributed. A query with hierarchical path identifiers for both hierarchical data spaces can therefore walk through the nodes of the physical hierarchical data space, avoiding having to access tuples that are not on the query path.

The physical hierarchical data space as shown in FIG. 5B can be traversed so that all the subdivisions are visited. Traversal is the process of visiting each subdivision in one or more hierarchical data spaces. Since physical hierarchical data spaces can contain multiple hierarchical data spaces, traversing a physical hierarchical data space may visit subdivision from multiple hierarchical data spaces. Traversal can also start at any subdivision in a hierarchical data space. The subdivision to start traversal can be specified by at least one hierarchical path identifier, since they identify the subdivisions in a hierarchical data space. Traversal can be performed in different ways to control the order the subdivisions are visited or operated upon. Various methods of traversal are contemplated, including, but not limited to, depth-first, pre-order, post-order, in-order, reverse pre-order, reverse post-order, reverse in-order, or breadth-first. Traversal methods for certain operations such as bounding or intersection queries can also include parent subdivisions.

Coordinated traversal is a way to efficiently traversing multiple physical hierarchical data spaces so that common subdivisions of their logical hierarchical data spaces are visited at the same time. Coordinated traversal is only possible for the elements of the physical hierarchical data spaces that have corresponding subdivisions of their logical hierarchical data spaces. The method of coordinated traversal may vary depending on the selected method of traversing the hierarchical data space.

Figure 6A:
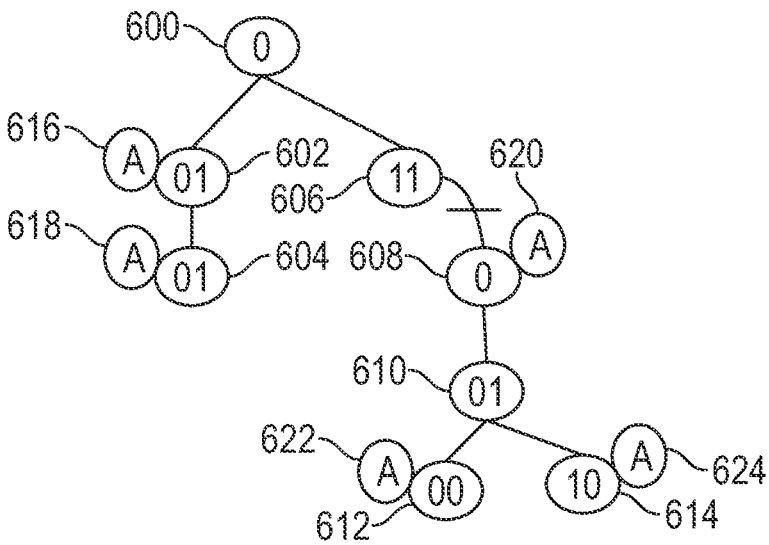
FIG. 6A shows storing tuples of a relation A in the subdivisions of a first hierarchical data space and a second hierarchical data space according to various embodiments.
Figure 6B:
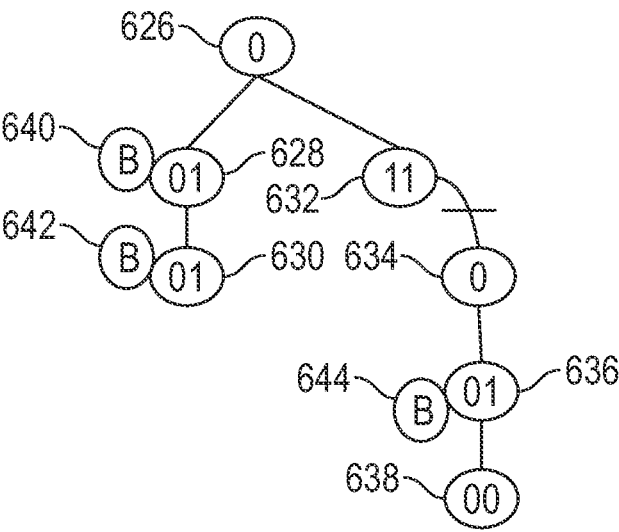
FIG. 6B shows storing tuples of a relation B in the subdivisions of a first hierarchical data space and a second hierarchical data space according to various embodiments.
Figure 6C:
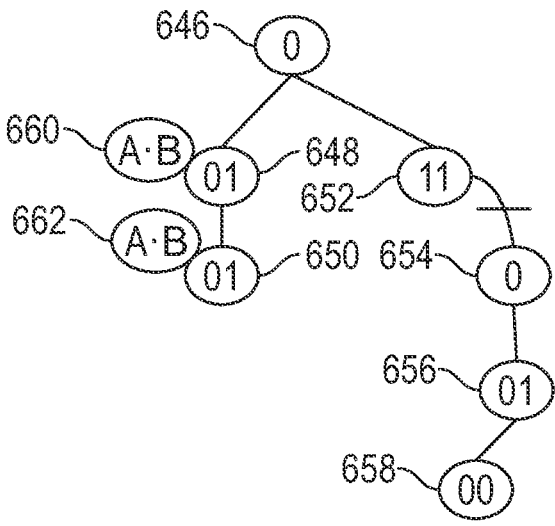
FIG. 6C shows the intermediate results of executing a probabilistic intersection operation using a plurality of hierarchical data spaces according to various embodiments.
Figure 6D:
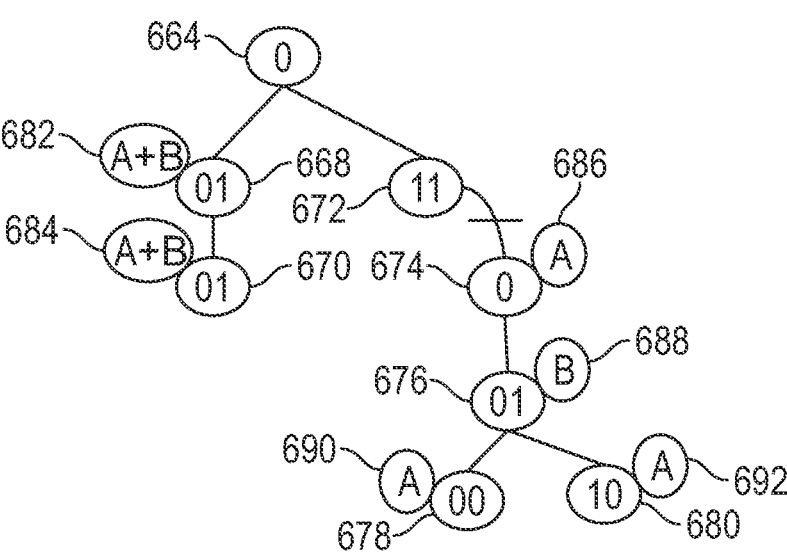
FIG. 6D shows the intermediate results of executing a probabilistic union operation using a plurality of hierarchical data spaces according to various embodiments.
Figure 6E:
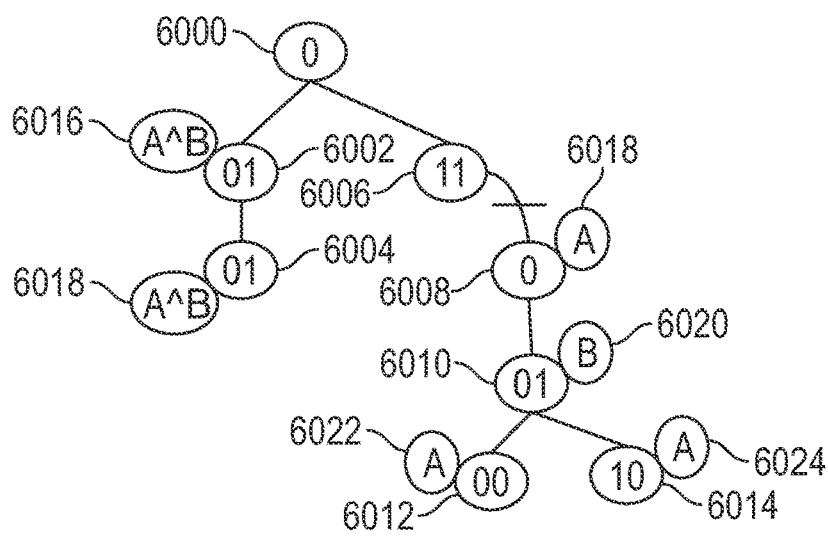
FIG. 6E shows the intermediate results of executing a difference operation using a plurality of hierarchical data spaces according to various embodiments.

Many higher-level operations can be composed from set operations such as union, intersection, and difference. The method of FIG. 1C can be used to efficiently perform operations using a plurality of hierarchical data spaces. FIG. 6A and FIG. 6B show physical hierarchical data spaces containing tuples for relation A and relation B, respectively. These tuples are stored in their respective hierarchical data spaces based on the hierarchical path identifiers generated for the value for some common attribute. For example, relation A and relation B may both have a Name attribute. FIG. 6C, FIG. 6D, and FIG. 6E show the candidate results after performing intersection, union, and difference operations on the tuples stored in the hierarchical data spaces.

An intersection operation could determine the set of tuple pairs from relation A and relation B that have the same value for a common attribute. It could also be used to determine the set of values for an attribute that exists in the tuples of both relations. It could also be used to perform an inner join operation off relation A and relation B. It could also be used to find the tuples in common between two sets.

FIG. 6C shows how to execute an intersection operation for a common attribute of relation A and relation B using the method of FIG. 1C and coordinated traversal of a plurality of hierarchical data spaces. The logical hierarchical data spaces used by the physical hierarchical data space shown in FIG. 6A are selected as the primary logical hierarchical data spaces. The logical hierarchical data spaces used by the physical hierarchical data space shown in FIG. 6B are selected as the secondary logical hierarchical data spaces.

The intersection operation can be performed for all or part of a hierarchical data space by traversing all the subdivisions of the hierarchical data spaces, a chosen subdivision, a chosen subdivision and its children, a chosen subdivision and its children to some depth, or a chosen subdivision and its parents up to some level, or a chosen subdivision and its parents and its children. For example, the intersection operation will start in subdivision 600 and subdivision 626. The current subdivision of the traversal can be used to determine the at least one subdivision of the at least one primary LHDS and the at least one subdivision of the at least one secondary logical hierarchical data space. Coordinating the traversal of corresponding hierarchical data spaces to determine the subdivisions to perform operations in is extraordinary efficient compared to searching the at least one secondary LHDS for every tuple found in the at least one primary logical hierarchical data space. The search is unnecessary if corresponding subdivisions are traversed in concert. The operation in the primary LHDS 600 will extract the tuples from relation A and the operation in the secondary LHDS 626 will extract the tuples from relation B. In each corresponding subdivision, tuples that have the same hierarchical path identifiers in all logical hierarchical data spaces for the attribute can be paired and evaluated to see if they have the same value for the attribute. Tuples that do not have the same hierarchical path identifiers in all logical hierarchical data spaces for the attribute cannot match. They have a probability of zero that they have a matching value for the attribute. Because no tuples exist in either subdivision 600 or 626, no pairs will have to be evaluated and result node 646 of FIG. 6C will have no entry.

The child subdivisions of subdivision 600 and subdivision 626 will be visited next. Sometimes a subdivision will be visited that is only present in one of the hierarchical data spaces. For some operations such as an intersection operation, non-common subdivisions can be skipped. For other operations such as an outer join or a union, non-common subdivisions for the outer relation may be traversed and their tuples included in the result.

When subdivision 602 and subdivision 628 are visited, tuple 616 and tuple 640 will be retrieved by the respective operations for each hierarchical data space. The tuple pair 660 in subdivision 648 can then be probabilistically evaluated in all logical hierarchical data spaces for the attribute to further determine which tuples to pair and evaluate. Finally, the tuple pair 660 can be fully evaluated to determine if the value of the attribute in tuple A matches the value of the attribute in tuple B. If so, the tuple or value of the tuple attribute is added to the result set.

The process will be repeated for each subdivision that is traversed. Tuple 618 will be retrieved from subdivision 604 and evaluated against tuple 642 in subdivision 630. The result 662 will be stored in subdivision 650. Subdivision 606 and subdivision 632 will be concurrently traversed and then their child subdivisions.

Subdivision 606 has an attached subtree 608 for a second logical hierarchical data space. Subdivision 632 also has a subtree 634 for a second logical hierarchical data space. These subtrees will also be traversed in a coordinated way. Subdivision 608 has a tuple 620 but subdivision 634 has none. Therefore, there can be no result to store in subdivision 654. For an intersection operation the result of no tuples is immediately known if a subdivision of either the primary or secondary LHDS has no tuples. For some operations such as intersection, the candidate set can be efficiently reduced without even evaluating the values in the tuples.

If a brute force method was used to perform the intersection operation, it would take fifteen operations to perform an intersection of the set of five tuples of relation A against the set of three tuples of relation B. With the method of performing operations using multiple hierarchical data spaces, only tuple pair 660 and tuple pair 662 must be evaluated because only tuples in corresponding subdivisions need to be paired and evaluated. Thirteen operations are saved compared to the brute force approach. If only the first LHDS was being used, tuple 620, tuple 622, and tuple 624 would all be stored in subdivision 606 of the first LHDS and tuple 644 of subdivision 636 would be stored in subdivision 632. Tuple pairs (tuple 620, tuple 644), (tuple 622, tuple 644), and (tuple 624, tuple 644) would all have to be evaluated. Using multiple hierarchical data spaces, none of these pairs must be evaluated for an intersection operation.

For instance, subdivision 608 has tuple 620 but subdivision 634 has no tuples resulting in no result to store in subdivision 654. Subdivision 636 has tuple 644 but subdivision 610 has no tuples resulting in no result to store in subdivision 656. Subdivision 612 has tuple 622 but subdivision 638 has no tuples resulting in no result to store in subdivision 658. The corresponding subdivision for subdivision 614 and tuple 624 is not present as the physical hierarchical data spaces can be sparse. Therefore, no resulting subdivision is needed.

FIG. 6D shows how to execute a union operation for a common attribute of relation A and relation B using a plurality of hierarchical data spaces. The common attribute does not have to have the same attribute name. For instance, the attribute name could be Name in relation A and Manager in relation B. A union operation could be used to determine all the names present in relation A and relation B. The union operator in relational algebra is a set operator, and as such, should not return duplicates. However, many data management systems implement union as a multi-set operation allowing duplicates unless distinct is specified. This is because of performance limitations for deduplication with large numbers of tuples. The union operation using a plurality of hierarchical data spaces can efficiently return a union of values present in relation A and relation B without duplicates.

The union operation can be performed by visiting all the subdivisions of the hierarchical data spaces, a chosen subdivision, a chosen subdivision and its children, a chosen subdivision and its children to some depth, or a chosen subdivision and its parents up to some level, or a chosen subdivision and its parents and its children. In other words, the portion of the hierarchical data spaces to be traversed and operated upon can be restricted.

The hierarchical data spaces of physical hierarchical data space 600 will be chosen as the primary logical hierarchical data spaces. The hierarchical data spaces of physical hierarchical data space 626 will be chosen as the secondary logical hierarchical data spaces. The hierarchical data spaces of physical hierarchical data space 664 of FIG. 6D will be chosen as the tertiary hierarchical data spaces.

The union operation will start in subdivision 600 and subdivision 626. The operation corresponding to the at least one subdivision of the at least one primary LHDS will extract the tuples from relation A and the operation corresponding to the at least one subdivision of the at least one secondary LHDS will extract the tuples from relation B. If the union operation is looking for the union of all tuples, then all the tuples found can be included. If the union operation is looking for the union of the values of a given attribute, then the tuples can be included in the candidate result set or the value extracted and included in the result set. If the union operation is looking for non-duplicate values, then the unique values can be extracted from the tuples and included in the result set. Because no tuples exist in either subdivision 600 or 626, no pairs will have to be evaluated and result node 664 of FIG. 6D will have no entry.

The child subdivisions of subdivision 600 and subdivision 626 will be traversed. A union operation without deduplication could be performed by traversing the physical hierarchical data spaces independently and simply adding each found tuple to the candidate result set. For a union set operation with no duplicates, the candidate result set can be traversed after processing is complete, and duplicates removed.

Because a given value can only map to a single subdivision in a hierarchical data space, only the values from the tuples with the same hierarchical path identifiers for the attribute in all hierarchical data spaces can possibly be duplicates that need to be checked. Therefore, coordinated traversal can be used so that the process is in common subdivisions at the same time. The duplicates can then be removed before adding them to the result set. This is a very efficient way to perform a relational algebra union set operation without duplicate values. Sometimes there will not be subdivisions in common. Non-common subdivisions for a union operation must be traversed, and their tuples included in the result.

When subdivision 602 and subdivision 628 are reached, tuple 616 and tuple 640 will be retrieved. The tuple pair 682 in subdivision 648 can then be probabilistically evaluated in all logical hierarchical data spaces for the attribute to further determine which tuples to pair and evaluate. Finally, the tuple pair 682 can be fully evaluated. For a union operation without deduplication, tuple 616 and tuple 640 can simply be included. For a union operation with deduplication, the tuple pair 682 can be deduplicated and the result included.

The process will be repeated for each subdivision. Tuple 618 will be retrieved from subdivision 604 and evaluated against tuple 642 in subdivision 630. The tuple pair 684 will be processed and the result stored in subdivision 670. Subdivision 606 and subdivision 632 will then be concurrently traversed and then their child subdivisions.

Subdivision 606 has an attached subtree 608 for a second logical hierarchical data space. Subdivision 632 also has a subtree 634 for a second logical hierarchical data space. These subtrees can also be traversed in a coordinated way. Subdivision 608 has a tuple 620 but subdivision 634 has none. Therefore, tuple 686 will be stored in subdivision 674. For a union operation the result of no tuples is immediately known if a subdivision for either relation has no tuples. Subdivision 610 has no tuple but subdivision 636 has tuple 644, so tuple 688 is stored in subdivision 676. Subdivision 612 has tuple 622 while subdivision 638 has no tuple, so tuple 690 is stored in subdivision 678. Subdivision 614 has tuple 624 while there is no corresponding subdivision in hierarchical data space 626 so tuple 692 is stored in subdivision 680.

If subdivision 632 did not have a subtree, the tuples present in subdivision 632 would be evaluated against the tuples in subtree 608. Similarly, if subdivision 606 does not have a subtree, then the tuples in subdivision 606 would be evaluated against the subtree 634.

If a brute force method was used to deduplicate the union of relation A and relation B, it would take fifteen operations to perform deduplication of the set of five tuples of relation A against the set of three tuples of relation B. With this method of performing operations using multiple hierarchical data spaces, tuple pair 682 and tuple pair 684 must be deduplicated because only tuples in corresponding subdivisions can be duplicates for the given attribute. Thirteen operations are saved compared to the brute force approach. If only the first LHDS was being used, tuple 620, tuple 622, and tuple 624 would all be stored in subdivision 606 of the first LHDS and tuple 644 of subdivision 636 would be stored in subdivision 632. Tuple pairs (tuple 620, tuple 644), (tuple 622, tuple 644), and (tuple 624, tuple 644) would all have to be deduplicated. Using multiple hierarchical data spaces, none of these pairs must be deduplicated for a union operation with deduplication.

For instance, subdivision 608 has tuple 620 but subdivision 634 has no tuples resulting in no possible result to store in subdivision 674. Subdivision 636 has tuple 644 but subdivision 610 has no tuples resulting in no possible result to store in subdivision 656. Subdivision 612 has tuple 622 but subdivision 638 has no tuples resulting in no possible result to store in subdivision 658. The corresponding subdivision for subdivision 614 and tuple 624 is not present as the physical hierarchical data spaces can be sparse. Therefore, no resulting subdivision is needed.

The union operation using a plurality of hierarchical data spaces and coordinated traversal may be used to merge files with data organized using hierarchical data spaces.

FIG. 6E shows the results of executing a difference operation on relation A and relation B using the hierarchical data spaces of FIG. 6A and FIG. 6B. A difference operation could be used to determine the differences between relation A and relation B for a given attribute. The different operation can be performed by visiting all the subdivisions of the hierarchical data spaces, a chosen subdivision, a chosen subdivision and its children, a chosen subdivision and its children to some depth, or a chosen subdivision and its parents up to some level, or a chosen subdivision and its parents and its children. In other words, the portion of the hierarchical data spaces to be traversed and operated upon can be restricted.

The hierarchical data spaces of physical hierarchical data space 600 will be chosen as the primary logical hierarchical data spaces. The hierarchical data spaces of physical hierarchical data space 626 will be chosen as the secondary logical hierarchical data spaces. The hierarchical data spaces of physical hierarchical data space 664 of FIG. 6D will be chosen as the tertiary hierarchical data spaces.

The difference operation will start in subdivision 600 and subdivision 626. The operation corresponding to the at least one subdivision of the at least one primary LHDS will extract the tuples from relation A and the operation corresponding to the at least one subdivision of the at least one secondary LHDS will extract the tuples from relation B. Because no tuples exist in either subdivision 600 or 626, no pairs will have to be evaluated and result node 6000 of FIG. 6E will have no entry.

The child subdivisions of subdivision 600 and subdivision 626 will be traversed. A difference operation could be performed by traversing the physical hierarchical data spaces independently and simply adding each found tuple to the candidate result set. The candidate result set can be traversed after processing is complete, and tuples pairs with identical values for the chosen attribute removed.

Because a given value can only map to a single subdivision in a hierarchical data space, only the values from the tuples with the same hierarchical path identifiers for the attribute in all hierarchical data spaces can possibly have the same value and need to be checked. Therefore, coordinated traversal can be used so that the process is in common subdivisions at the same time. Sometimes there will not be subdivisions in common. For the difference operation, they must be traversed, and their tuples included in the result.

When subdivision 602 and subdivision 628 are reached, tuple 616 and tuple 640 will be retrieved. The tuple pair 6016 in subdivision 6002 can then be probabilistically evaluated in all logical hierarchical data spaces for the attribute to determine if they could possibly have the same value. If they do not match in all logical hierarchical data spaces, they have different values for the attribute and each tuple can be kept in the result set. For a difference operation, each tuple in relation A in that subdivision must be paired with each tuple in relation B in that subdivision. If a tuple is part of any tuple pair where all the logical hierarchical data spaces match, then that tuple pair must eventually be evaluated by value to determine if their values do in fact match. Assuming tuple pair 6016 matches in all hierarchical data spaces, then it will eventually need to be fully evaluated.

The process will be repeated for each subdivision. Tuple 618 will be retrieved from subdivision 604 and evaluated against tuple 642 in subdivision 630. The tuple pair 6018 will be processed and the result stored in subdivision 6004. Subdivision 606 and subdivision 632 will then be concurrently traversed and then their child subdivisions.

Subdivision 606 has an attached subtree 608 for a second logical hierarchical data space. Subdivision 632 also has a subtree 634 for a second logical hierarchical data space. These subtrees can also be traversed in a coordinated way. Subdivision 608 has a tuple 620 but subdivision 634 has none. Therefore, tuple 6018 will be stored in subdivision 6008. Subdivision 610 has no tuple but subdivision 636 has tuple 644, so tuple 6020 is stored in subdivision 6010. Subdivision 612 has tuple 622 while subdivision 638 has no tuple, so tuple 6022 is stored in subdivision 6012. Subdivision 614 has tuple 624 while there is no corresponding subdivision in hierarchical data space 626 so tuple 6024 is stored in subdivision 6014.

Various methods of performing intersection, union, and difference operations using a plurality of hierarchical data spaces are contemplated, including, but not limited to retrieving the tuples from the plurality of hierarchical data spaces, storing them in a result set, and performing the operation while iterating through the result set; traversing the primary logical hierarchical data spaces and secondary logical hierarchical data spaces and performing the operation on corresponding subdivisions; retrieving the tuples from the at least one primary logical hierarchical data space, storing them in a result set, performing the operation while traversing the at least one secondary LHDS and iterating through the result set looking for matching tuples; retrieving the tuples from the at least one primary logical hierarchical data space, storing them in a result physical hierarchical data space, performing the operation while traversing the at least one secondary LHDS and the result physical hierarchical data space. The selection of the primary and secondary logical hierarchical data spaces may be reversed for some operations. The physical hierarchical data spaces may be partitioned across many servers and multiple instances of the operation could be performed in parallel and then gathered into a result set.

Figure 7A:
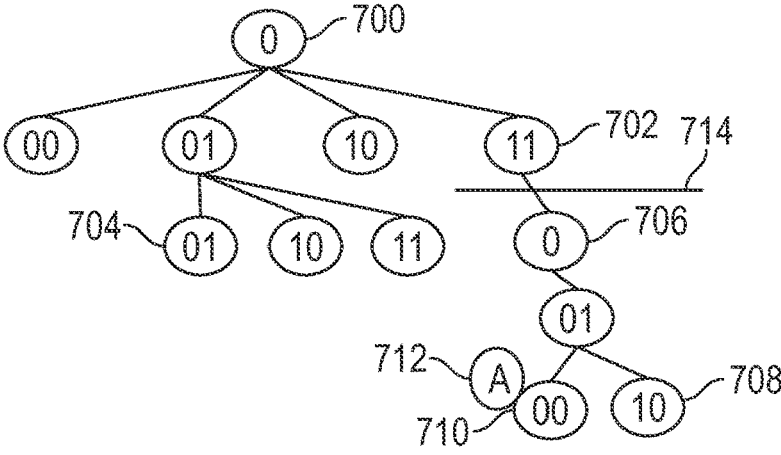
FIG. 7A shows a physical hierarchical data space comprised of a first primary logical hierarchical space and a second primary logical hierarchical data space with a single tuple according to various embodiments.
Figure 7B:
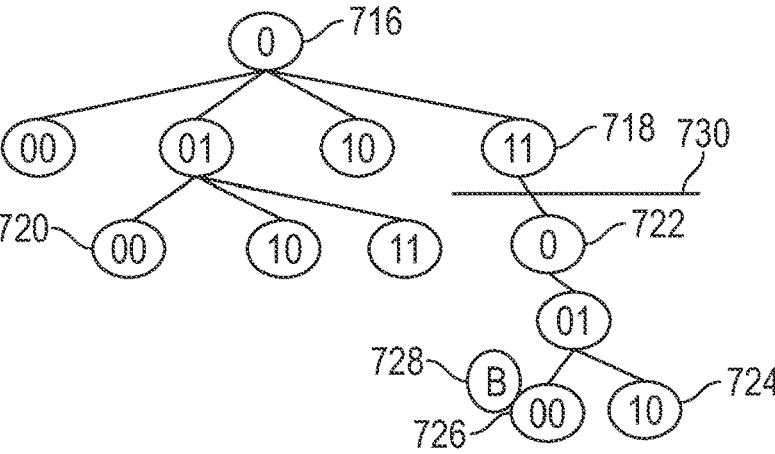
FIG. 7B shows a physical hierarchical data space comprised of a first secondary logical hierarchical space and a second secondary logical hierarchical data space with a single tuple according to various embodiments.
Figure 7C:
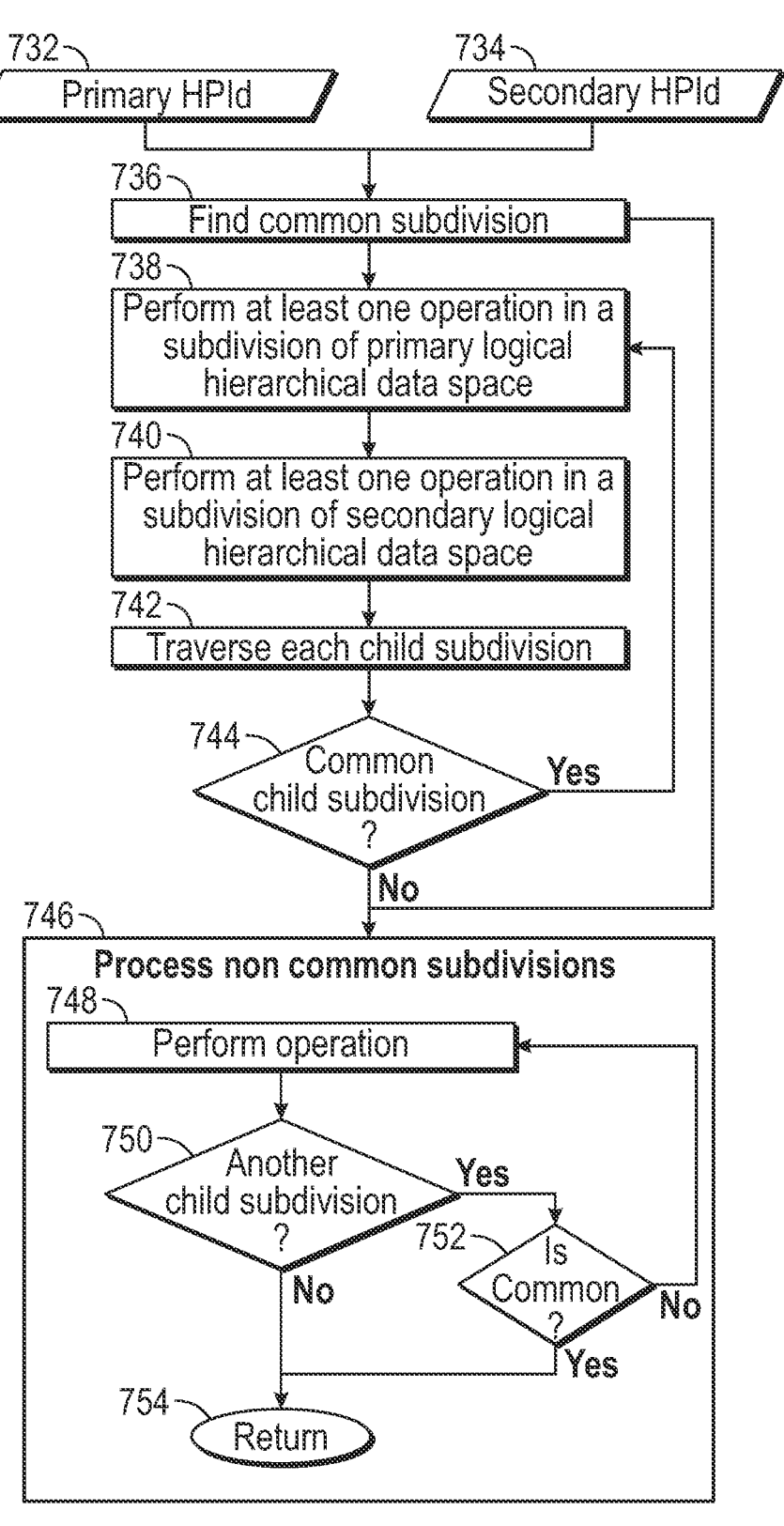
FIG. 7C shows a method for performing composite operations using a plurality of hierarchical data spaces by coordinating the traversal of a plurality of hierarchical data spaces according to various embodiments.

FIG. 7A shows a physical hierarchical data space comprised of a first primary logical hierarchical space and a second primary LHDS with a single tuple for relation A. FIG. 7B shows a physical hierarchical data space comprised of a first secondary logical hierarchical space and a second secondary LHDS with a single tuple for relation B. FIG. 7C shows a method for performing operations using a plurality of hierarchical data spaces by determining which subdivisions to perform operations in using coordinated traversal of multiple physical hierarchical data spaces.

The method of coordinated traversal can be parameterized using hierarchical path identifiers to specify the subdivisions in each hierarchical data space to start the traversal. This is useful for performing operations on subsets of the data space. Primary HPId 732 specifies where to start the traversal process in the at least one primary logical hierarchical data space. Secondary HPId 734 specifies where to start the traversal process in the at least one secondary logical hierarchical data space.

The purpose of coordinated traversal is so that the operations can be performed in corresponding subdivisions of multiple hierarchical data spaces. Therefore, the coordinated traversal process must find a common subdivision to start as shown by step 736. This can be done by finding the deepest common subdivision of HPId 732 and HPId 734 that has a depth less than or equal to the depth of each hierarchical path identifier. For instance, if the primary HPId 732 was {0-01-01} and secondary HPId 734 was {0-01}, then the deepest common subdivision with a depth less than or equal to the depth of each HPId is {0-01}. {0-01} is not a subdivision that is contained in the branch {0-01-01}. {0-01} and any child subdivisions that are not {0-01-01} may need to be processed as a non-common subdivision 746. Step 748 will perform the operation if applicable. Step 750 will iterate through all child subdivisions. For each child subdivision, step 752 will determine if it is a common subdivision and if so, step 754 will be called to return the common subdivision. If it is not common, step 752 will go back to step 748 to perform the operation on the subdivision, if applicable for the operation. This will continue until there are no more subdivisions or a common subdivision is found. The subdivisions of additional hierarchical data spaces that are attached will also be included, such as subdivision 706 and all of its children. If no common subdivision is found, step 736 may then call process non-common subdivisions 746 for the at least one secondary logical hierarchical data space. The process will terminate when there are no more subdivisions to process.

If a common subdivision is found, then step 738 will perform at least one operation in that subdivision of the at least one primary logical hierarchical data space. Step 740 will perform at least one operation in the same subdivision of the at least one secondary logical hierarchical data space. Step 742 will then process each child subdivision for the at least one primary LHDS and the at least one secondary logical hierarchical data space. Step 744 will check if they are common to both and if they are, the process will go to step 738 to perform an operation in a subdivision of the primary hierarchical data space. If they are not common, the process non common subdivisions 746 will be called. The process is recursive so eventually the common and non-common subdivisions will be visited. However, if an operation does not require processing of non-common subdivisions, the traversal of a non-common's subdivisions child subdivisions can be skipped.

Figure 8A:
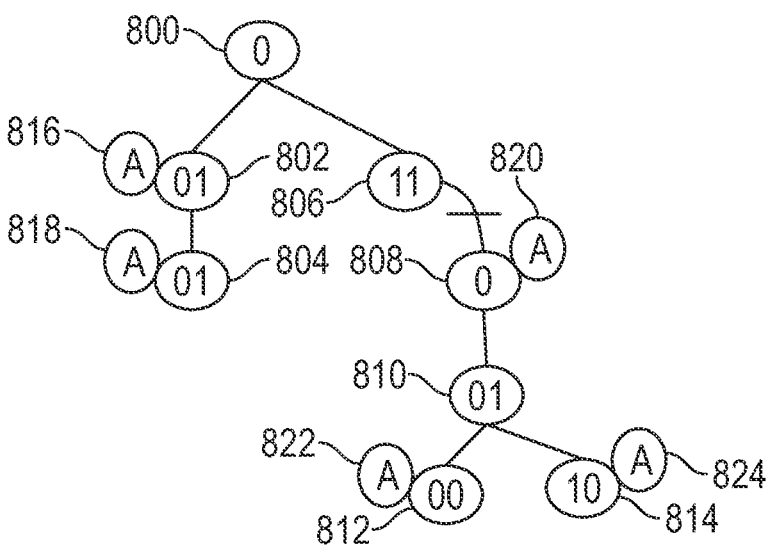
FIG. 8A shows the tuples of a relation A being stored in a physical hierarchical data space according to various embodiments.
Figure 8B:
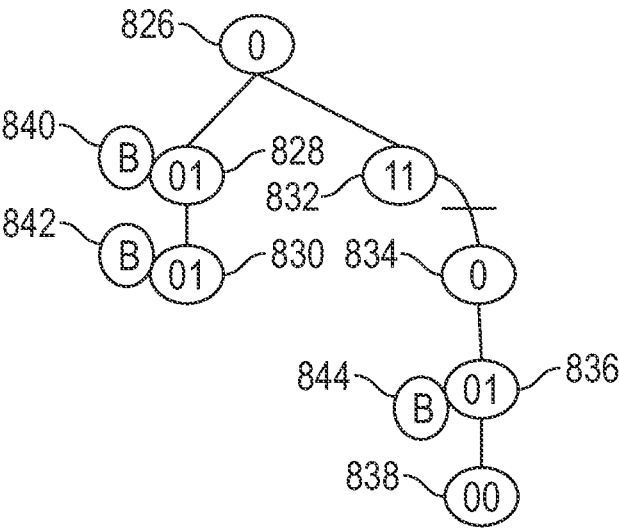
FIG. 8B shows the tuples of a relation B being stored in a physical hierarchical data space according to various embodiments.

FIG. 8A shows the tuples of a relation A being stored in a physical hierarchical data space. FIG. 8B shows the tuples of a relation B being stored in a physical hierarchical data space.

Figure 8C:
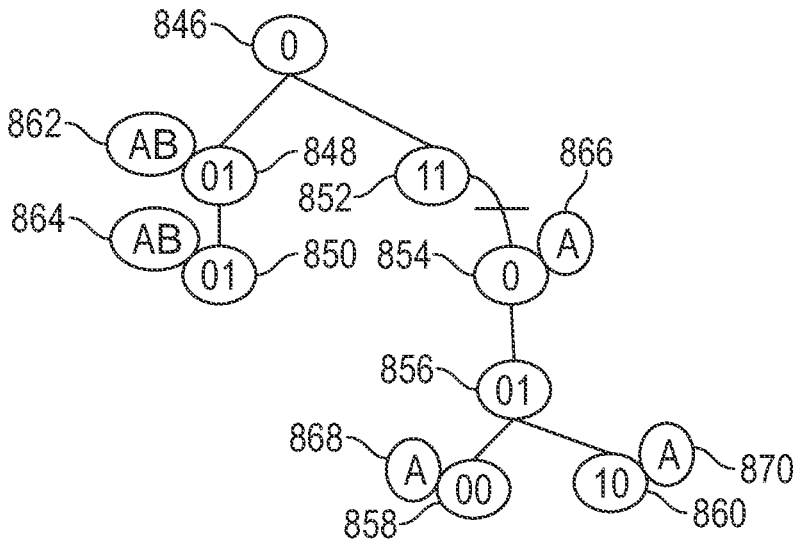
FIG. 8C shows the intermediate results of performing a probabilistic left outer join of relation A and relation B according to various embodiments.

FIG. 8C shows the candidate results of performing a left outer join of relation A and relation B. The method of FIG. 1C can be used to perform a left outer join of relation A and relation B. There are multiple ways of determining the subdivisions to operate in.

Figure 8D:
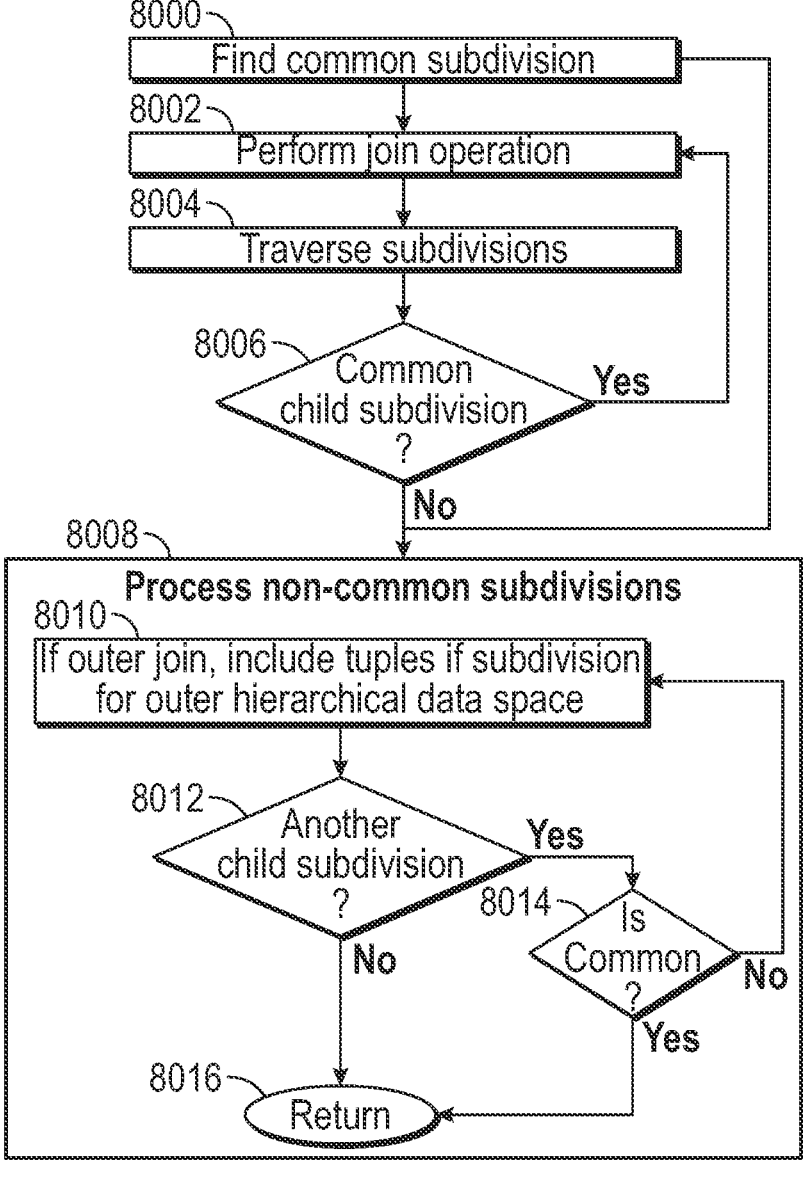
FIG. 8D shows a method of performing a probabilistic join of relation A and relation B by coordinating the traversal of a plurality of hierarchical data spaces according to various embodiments.

FIG. 8D shows a method of performing a probabilistic join of relation A and relation B using a plurality of hierarchical data spaces and coordinated traversal. The process starts by finding a common subdivision 8000. The at least one primary LHDS will be the driving hierarchical data space because it corresponds to the driving relation A. Any non-common subdivisions for the at least one primary LHDS are processed by the method of 8008. Non-common subdivisions for the at least one secondary LHDS are ignored. Once a common subdivision is found, perform join operation 8002 will perform the operations to join the relations in the corresponding subdivision of the at least one primary LHDS and the corresponding subdivision of the at least one secondary logical hierarchical data space. The join operation can be performed using a variety of operations. The tuples for relation A can be retrieved from the subdivision of at least one primary LHDS and the tuples for relation B can be retrieved from the subdivisions of the at least one secondary logical hierarchical data space. Each tuple pair may be probabilistically evaluated in all applicable hierarchical data spaces to determine if they are a match for the join condition. If so, the tuple pair may be stored for later evaluation by value or simply evaluated by value during the join operation.

Step 8004 will traverse the child subdivisions of the current common subdivision. Step 8006 will determine if the child subdivision is a common subdivision. If so, the process will go to perform join operation to recursively process the subdivision. Other ways to traverse the hierarchical data space are also possible. If it is not a common subdivision and the subdivision is part of the at least one primary logical hierarchical data space, then process non-common subdivisions 8008 will be called. Since this is an outer join, step 8010 will include the tuples for the outer or driving relation. The tuples for the outer relation are included even if there is not a matching tuple in the other relation. Step 8012 will iterate through any child subdivisions and if there are any, check if the subdivision is common in step 8014. If not, the subdivision will be processed by the operations in step 8010. This is a recursive approach to processing the subdivisions. If there are no more child subdivisions or a common subdivision is found, then the process will return to the main process via the return step in 8016. The step to check if a subdivision is common is only there for the initial find common subdivision. Once a non-common subdivision is found afterward, it will not find any common subdivisions among its child subdivisions.

FIG. 8C shows the candidate results of this outer join of relation A and relation B. Subdivision 800 and subdivision 826 contain no tuples, so subdivision 846 will have no candidate result. Subdivision 802 has a tuple 816 for relation A and subdivision 828 has a tuple 840 for relation B. Therefore, subdivision 848 will have a candidate tuple pair 862. Subdivision 804 has a tuple 818 for relation A and subdivision 830 has a tuple 842 for relation B. Therefore, subdivision 850 will have a candidate tuple pair 864. Subdivision 806 and subdivision 832 have no tuples so subdivision 852 will have no candidates. Subdivision 808 has a tuple 820 for relation A while subdivision 834 has no tuples. Since the hierarchical data spaces of FIG. 8A correspond to the driving relation of the outer join, relation A, tuple 866 will be included in subdivision 854. Subdivision 810 has no tuples but subdivision 836 as a tuple for relation B. Since FIG. 8B does not correspond to the driving relation of the outer join, relation A, no tuples will be stored in subdivision 856. If relation B was the driving relation because it was a right outer join, then tuple 844 would be included in subdivision 856. Subdivision 812 contains tuple 822 for relation A and there are no tuples in subdivision 838, so tuple 868 is stored in subdivision 858. Subdivision 814 has a tuple 824 for relation A but there is no corresponding subdivision in the secondary logical hierarchical data spaces. Because this is an outer join and relation A is the driving relation, tuple 870 will be stored in subdivision 860.

By using a plurality of hierarchical data spaces and by using coordinated traversal to determine the subdivisions to perform the operations for an outer join operation, the candidate result set for the join was efficiently generated. Now the candidate tuple pairs or single tuples for the outer relation can be evaluated by value to complete the join operation.

Although the source hierarchical data spaces are shown as separate physical hierarchical data spaces in FIG. 8A and FIG. 8B, the contents of the hierarchical data spaces could be stored in the same data structure. In other words, multiple hierarchical data spaces can be overlaid on a single data structure. This would allow tuples for two different relations to be stored in the same physical data structure. The efficiency benefit of this method is that a process can traverse this single data structure, performing the operations on the tuples for each respective hierarchical data space as the process visits each node.

Figure 9A:
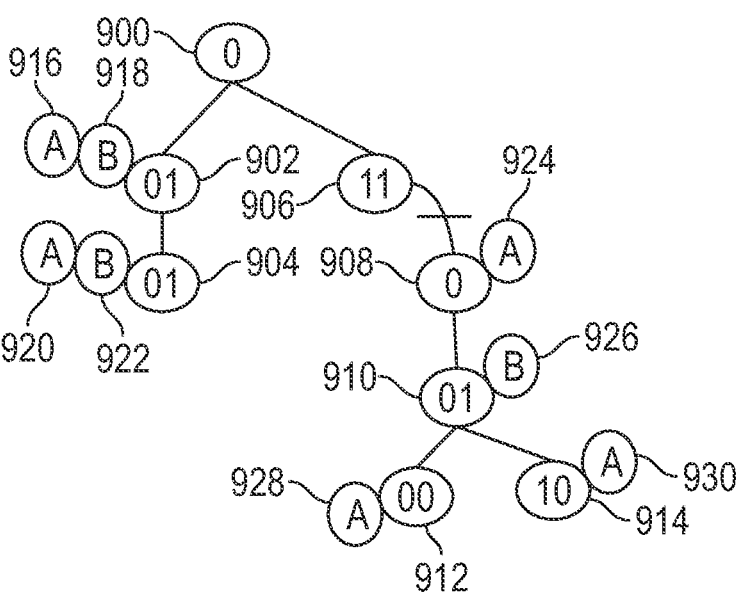
FIG. 9A shows the tuples of relation A and the tuples of relation B stored in a plurality of shared hierarchical data spaces according to various embodiments.

FIG. 9A shows the tuples of relation A and the tuples of relation B stored in a shared physical hierarchical data space. By overlaying multiple hierarchical data spaces on one shared physical hierarchical data space, the subdivisions of the at least one primary LHDS and the subdivisions of the at least one secondary LHDS automatically correspond. Instead of coordinated traversal, the subdivisions can be traversed, and the join operation performed on the tuples in each subdivision.

Figure 9B:
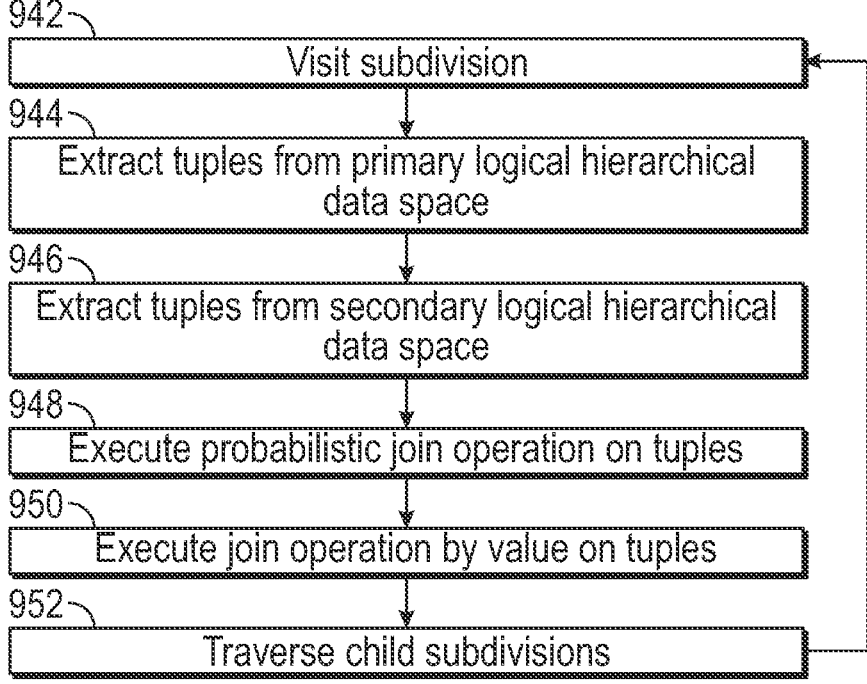
FIG. 9B shows a method of performing a probabilistic join using a plurality of shared hierarchical data spaces according to various embodiments.

FIG. 9B shows a method of performing a probabilistic join using a plurality of hierarchical data spaces in a shared physical hierarchical data space. They can start in any specified subdivision. In this case, it is the root subdivision {0}. Step 942 will visit that subdivision. Step 944 will perform an operation to extract the tuples for the at least one primary logical hierarchical data space. These are also the tuples for relation A. Step 946 will perform an operation to extract the tuples for the at least one secondary logical hierarchical data space. Step 948 will execute the join operation on each tuple pair of relation A and relation B in the current subdivision. Only tuples that match the condition in all hierarchical data spaces will be included. If the join is a left outer join with relation A as the driving relation, all the tuples for relation A in the current subdivision will be included. If the join is a right outer join with relation B as the driving relation, all the tuples for relation B in the current subdivision will be included. Optionally, step 950 will check the join condition by value for any tuples that satisfied the probabilistic join operation. Checking the join condition by value can also happen later after the result set is sent to another server, client, or device. If the tuples are encrypted, the join condition can be evaluated by value after the tuples are decrypted. Step 952 will recursively traverse any child subdivisions of the current subdivision. Although the method shows recursively traversing the hierarchical data space, many different types of traversals could be used.

Many other operations that can be performed using separate sets of hierarchical data spaces can also be performed using a shared physical hierarchical data space. Although two relations are joined in the example, any number of relations may be joined.

Figures 9C, 10:
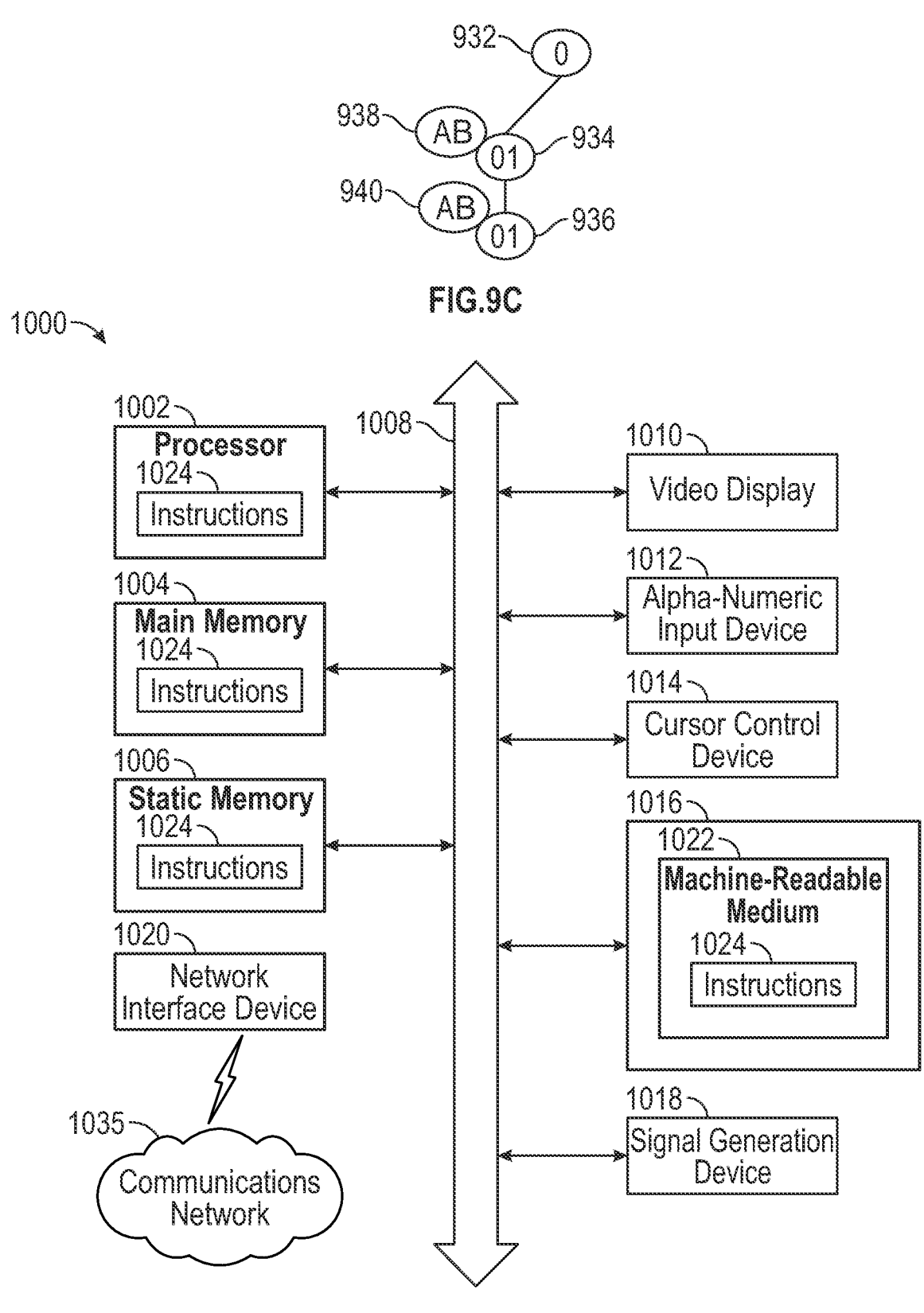
FIG. 9C shows the candidate results of an inner probabilistic join of relation A and relation B using a plurality of hierarchical data spaces according to various embodiments.
FIG. 10 is a schematic diagram of a machine in the form of a computer system within which a set of instructions, when executed, may cause the machine to perform any one or more of the methodologies or operations of the systems and methods for performing operations using a plurality of hierarchical data spaces.

FIG. 9C shows the candidate results of an inner probabilistic join of relation A and relation B using a plurality of hierarchical data spaces stored in a shared physical hierarchical data space 900. Subdivision 900 has no tuples, so subdivision 932 has no results. Subdivision 902 has a tuple 916 for relation A and a tuple 918 for relation B. This tuple pair 938 will be stored in subdivision 934 of the candidate result set. Subdivision 904 has a tuple 920 for relation A and a tuple 922 for relation B. Therefore, tuple pair 940 will be stored in subdivision 936 of the result set. Since this is an inner join, no single tuples are candidates for the result set. As the other subdivisions are traversed and the tuples retrieved, no tuple pairs will be found to include in the candidate result set.

Referring now also to FIG. 10, at least a portion of the methodologies and techniques described with respect to the exemplary embodiments of the method and system described herein (e.g., the methods and systems of FIG. 1C/FIG. 2A) can incorporate a machine, such as, but not limited to, computer system 1000, or other computing device within which a set of instructions, when executed, may cause the machine to perform any one or more of the methodologies or functions discussed above. The machine may be configured to facilitate various operations conducted by the system FIG. 1C/FIG. 2A. For example, the machine may be configured to, but is not limited to, assist the system FIG. 1C/FIG. 2A by providing processing power to assist with processing loads experienced in the system FIG. 1C/FIG. 2A, by providing storage capacity for storing instructions or data traversing the system FIG. 1C/FIG. 2A, or by assisting with any other operations conducted by or within the system FIG. 1C/FIG. 2A.

In some embodiments, the machine may operate as a standalone device. In some embodiments, the machine may be connected (e.g., using communications network 1035, another network, or a combination thereof) to and assist with operations performed by other machines and systems. The machine may be connected with any component in the system FIG. 1C/FIG. 2A. In a networked deployment, the machine may operate in the capacity of a server or a client, such as a client user machine, in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010, which may be, but is not limited to, a liquid crystal display (LCD), a flat panel, a solid state display, or a cathode ray tube (CRT). The computer system 1000 may include an input device 1012, such as, but not limited to, a keyboard, a cursor control device 1014, such as, but not limited to, a mouse, a disk drive unit 1016, a signal generation device 1018, such as, but not limited to, a speaker or remote control, and a network interface device 1020.

The disk drive unit 1016 may include a machine-readable medium 1022 on which is stored one or more sets of instructions 1024, such as, but not limited to, software embodying any one or more of the methodologies or functions described herein, including those methods illustrated above. The instructions 1024 may also reside, completely or at least partially, within the main memory 1004, the static memory 1006, or within the processor 1002, or a combination thereof, during execution thereof by the computer system 1000. The main memory 1004 and the processor 1002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1022 containing instructions 1024 so that a device connected to the communications network 1035, another network, or a combination thereof, can send or receive voice, video, or data, and to communicate over the communications network 1035, another network, or a combination thereof, using the instructions. The instructions 1024 may further be transmitted or received over the communications network 1035, another network, or a combination thereof, via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A system for performing an operation, the system comprising:

a memory that stores instructions; and a processor that executes the instructions to perform operations, the operations comprising:

choosing at least one primary logical hierarchical data space, wherein the at least one primary logical hierarchical data space includes a plurality of subdivisions;

determining at least one subdivision of the at least one primary logical hierarchical data space;

choosing at least one secondary logical hierarchical data space, wherein the at least one secondary logical hierarchical data space includes a plurality of subdivisions;

determining at least one subdivision of the at least one secondary logical hierarchical data space;

executing a composite operation on at least one relation wherein the composite operation comprises:

retrieving at least one primary tuple from the at least one subdivision of the at least one primary logical hierarchical data space;

performing at least one operation corresponding to the at least one subdivision of the at least one secondary logical hierarchical data space.

2. The system of claim 1, wherein choosing at least one primary hierarchical data space comprises choosing a plurality of different primary logical hierarchical data spaces.

3. The system of claim 1, wherein choosing at least one secondary hierarchical data space comprises choosing a plurality of different secondary logical hierarchical data spaces.

4. The system of claim 1, wherein determining at least one subdivision of the at least one secondary logical hierarchical data space comprises extracting at least one hierarchical path identifier stored in the at least one primary tuple.

5. The system of claim 1, wherein determining the at least one subdivision of the at least one primary logical hierarchical data space comprises traversing at least one subdivision of the at least one primary logical hierarchical data space.

6. The system of claim 1, wherein determining the at least one subdivision of the at least one secondary logical hierarchical data space comprises traversing at least one subdivision of the at least one primary logical hierarchical data space.

7. The system of claim 1, wherein determining the at least one subdivision of the at least one secondary logical hierarchical data space comprises traversing at least one subdivision of the at least one secondary logical hierarchical data space.

8. The system of claim 1, wherein determining the at least one subdivision of the at least one primary logical hierarchical data space comprises traversing the subdivisions of at least one tertiary hierarchical data space.

9. The system of claim 1, wherein determining the at least one subdivision of the at least one secondary logical hierarchical data space comprises traversing the subdivisions of at least one tertiary hierarchical data space.

10. The system of claim 1 further comprising coordinated traversal of the subdivisions of the at least one primary logical hierarchical data space and the subdivisions of the at least one secondary logical hierarchical data space.

11. The system of claim 1, wherein retrieving at least one primary tuple corresponding to the at least one subdivision of the at least one primary logical hierarchical data space comprises accessing at least one file corresponding to the at least one subdivision of the at least one primary logical hierarchical data space.

12. The system of claim 1, wherein retrieving at least one primary tuple corresponding to the at least one subdivision of the at least one primary logical hierarchical data space comprises accessing at least one data block corresponding to the at least one subdivision of the at least one primary logical hierarchical data space.

13. The system of claim 1, wherein the performing at least one operation corresponding to the at least one subdivision of the at least one secondary logical hierarchical data space comprises storing at least one secondary tuple.

14. The system of claim 1, wherein the performing at least one operation corresponding to the at least one subdivision of the at least one secondary logical hierarchical data space comprises deleting at least one secondary tuple.

15. The system of claim 1, wherein the performing at least one operation corresponding to the at least one subdivision of the at least one secondary logical hierarchical data space comprises storing at least one hierarchical path identifier that identifies the at least one subdivision of the at least one primary logical hierarchical data space.

16. The system of claim 1, wherein the performing at least one operation corresponding to the at least one subdivision of the at least one secondary logical hierarchical data space comprises probabilistic filtering a plurality of tuples corresponding to the at least one subdivision of the at least one secondary logical hierarchical data space.

17. The system of claim 1, wherein the performing at least one operation corresponding to the at least one subdivision of the at least one secondary logical hierarchical data space comprises retrieving at least one secondary tuple.

18. The system of claim 17, wherein the performing at least one operation corresponding to the at least one subdivision of the at least one secondary logical hierarchical data space comprises joining the at least one primary tuple with the at least one secondary tuple.

19. The system of claim 1, further comprising storing a plurality of tuples corresponding to the at least one primary logical hierarchical data space and a plurality of tuples corresponding to the at least one secondary logical hierarchical data space in a shared physical hierarchical data space, wherein the shared physical hierarchical data space comprises a plurality of subdivisions.

20. The system of claim 19, wherein determining the at least one subdivision of the at least one primary logical hierarchical data space comprises traversing the subdivisions of the shared physical hierarchical data space.

21. The system of claim 19, wherein determining the at least one subdivision of the at least one secondary logical hierarchical data space comprises traversing the subdivisions of the shared physical hierarchical data space.

22. A method for performing an operation, the method comprising:

choosing, by utilizing instructions from a memory that are executed by a processor, at least one primary logical hierarchical data space, wherein the at least one primary logical hierarchical data space includes a plurality of subdivisions;

determining at least one subdivision of the at least one primary logical hierarchical data space;

choosing at least one secondary logical hierarchical data space, wherein the at least one secondary logical hierarchical data space includes a plurality of subdivisions;

determining at least one subdivision of the at least one secondary logical hierarchical data space;

executing a composite operation on at least one relation wherein the composite operation comprises:

retrieving at least one primary tuple from the at least one subdivision of the at least one primary logical hierarchical data space; and performing at least one operation corresponding to the at least one subdivision of the at least one secondary logical hierarchical data space.

23. The method of claim 22, wherein choosing at least one primary hierarchical data space comprises choosing a plurality of different primary logical hierarchical data spaces.

24. The method of claim 22, wherein choosing at least one secondary hierarchical data space comprises choosing a plurality of different secondary logical hierarchical data spaces.

25. The method of claim 22, wherein determining at least one subdivision of the at least one secondary logical hierarchical data space comprises extracting at least one hierarchical path identifier stored in the at least one primary tuple.

26. The method of claim 22, wherein determining the at least one subdivision of the at least one primary logical hierarchical data space comprises traversing at least one subdivision of the at least one primary logical hierarchical data space.

27. The method of claim 22, wherein determining the at least one subdivision of the at least one secondary logical hierarchical data space comprises traversing at least one subdivision of the at least one primary logical hierarchical data space.

28. The method of claim 22, wherein determining the at least one subdivision of the at least one secondary logical hierarchical data space comprises traversing at least one subdivision of the at least one secondary logical hierarchical data space.

29. The method of claim 22, wherein determining the at least one subdivision of the at least one primary logical hierarchical data space comprises traversing the subdivisions of at least one tertiary hierarchical data space.

30. The method of claim 22, wherein determining the at least one subdivision of the at least one secondary logical hierarchical data space comprises traversing the subdivisions of at least one tertiary hierarchical data space.

31. The method of claim 22, further comprising coordinated traversal of the subdivisions of the at least one primary logical hierarchical data space and the subdivisions of the at least one secondary logical hierarchical data space.

32. The method of claim 22, wherein retrieving at least one primary tuple corresponding to the at least one subdivision of the at least one primary logical hierarchical data space comprises accessing at least one file corresponding to the at least one subdivision of the at least one primary logical hierarchical data space.

33. The method of claim 22, wherein retrieving at least one primary tuple corresponding to the at least one subdivision of the at least one primary logical hierarchical data space comprises accessing at least one data block corresponding to the at least one subdivision of the at least one primary logical hierarchical data space.

34. The method of claim 22, wherein the performing at least one operation corresponding to the at least one subdivision of the at least one secondary logical hierarchical data space comprises storing at least one secondary tuple.

35. The method of claim 22, wherein the performing at least one operation corresponding to the at least one subdivision of the at least one secondary logical hierarchical data space comprises deleting at least one secondary tuple.

36. The method of claim 22, wherein the performing at least one operation corresponding to the at least one subdivision of the at least one secondary logical hierarchical data space comprises storing at least one hierarchical path identifier that identifies the at least one subdivision of the at least one primary logical hierarchical data space.

37. The method of claim 22, wherein the performing at least one operation corresponding to the at least one subdivision of the at least one secondary logical hierarchical data space comprises probabilistic filtering a plurality of tuples corresponding to the at least one subdivision of the at least one secondary logical hierarchical data space.

38. The method of claim 22, wherein the performing at least one operation corresponding to the at least one subdivision of the at least one secondary logical hierarchical data space comprises retrieving at least one secondary tuple.

39. The method of claim 38, wherein the performing at least one operation corresponding to the at least one subdivision of the at least one secondary logical hierarchical data space comprises joining the at least one primary tuple with the at least one secondary tuple.

40. The method of claim 22, further comprising storing a plurality of tuples corresponding to the at least one primary logical hierarchical data space and a plurality of tuples corresponding to the at least one secondary logical hierarchical data space in a shared physical hierarchical data space, wherein the shared physical hierarchical data space comprises a plurality of subdivisions.

41. The method of claim 40, wherein determining the at least one subdivision of the at least one primary logical hierarchical data space comprises traversing the subdivisions of the shared physical hierarchical data space.

42. The method of claim 40, wherein determining the at least one subdivision of the at least one secondary logical hierarchical data space comprises traversing the subdivisions of the shared physical hierarchical data space.

43. A non-transitory computer readable device including instructions, which when loaded and executed by a processor, causes the processor to perform operations comprising:

a memory that stores instructions; and a processor that executes the instructions to perform operations, the operations comprising:

choosing at least one primary logical hierarchical data space, wherein the at least one primary logical hierarchical data space includes a plurality of subdivisions;

determining at least one subdivision of the at least one primary logical hierarchical data space;

choosing at least one secondary logical hierarchical data space, wherein the at least one secondary logical hierarchical data space includes a plurality of subdivisions;

determining at least one subdivision of the at least one secondary logical hierarchical data space;

executing a composite operation on at least one relation wherein the composite operation comprises:

retrieving at least one primary tuple from the at least one subdivision of the at least one primary logical hierarchical data space; and performing at least one operation corresponding to the at least one subdivision of the at least one secondary logical hierarchical data space.

44. The non-transitory computer readable device of claim 43, wherein choosing at least one primary hierarchical data space comprises choosing a plurality of different primary logical hierarchical data spaces.

45. The non-transitory computer readable device of claim 43, wherein choosing at least one secondary hierarchical data space comprises choosing a plurality of different secondary logical hierarchical data spaces.

46. The non-transitory computer readable device of claim 43, wherein determining at least one subdivision of the at least one secondary logical hierarchical data space comprises extracting at least one hierarchical path identifier stored in the at least one primary tuple.

47. The non-transitory computer readable device of claim 43, wherein determining the at least one subdivision of the at least one primary logical hierarchical data space comprises traversing at least one subdivision of the at least one primary logical hierarchical data space.

48. The non-transitory computer readable device of claim 43, wherein determining the at least one subdivision of the at least one secondary logical hierarchical data space comprises traversing at least one subdivision of the at least one primary logical hierarchical data space.

49. The non-transitory computer readable device of claim 43, wherein determining the at least one subdivision of the at least one secondary logical hierarchical data space comprises traversing at least one subdivision of the at least one secondary logical hierarchical data space.

50. The non-transitory computer readable device of claim 43, wherein determining the at least one subdivision of the at least one primary logical hierarchical data space comprises traversing the subdivisions of at least one tertiary hierarchical data space.

51. The non-transitory computer readable device of claim 43, wherein determining the at least one subdivision of the at least one secondary logical hierarchical data space comprises traversing the subdivisions of at least one tertiary hierarchical data space.

52. The non-transitory computer readable device of claim 43, further comprising coordinated traversal of the subdivisions of the at least one primary logical hierarchical data space and the subdivisions of the at least one secondary logical hierarchical data space.

53. The non-transitory computer readable device of claim 43, wherein retrieving at least one primary tuple corresponding to the at least one subdivision of the at least one primary logical hierarchical data space comprises accessing at least one file corresponding to the at least one subdivision of the at least one primary logical hierarchical data space.

54. The non-transitory computer readable device of claim 43, wherein retrieving at least one primary tuple corresponding to the at least one subdivision of the at least one primary logical hierarchical data space comprises accessing at least one data block corresponding to the at least one subdivision of the at least one primary logical hierarchical data space.

55. The non-transitory computer readable device of claim 43, wherein the performing at least one operation corresponding to the at least one subdivision of the at least one secondary logical hierarchical data space comprises storing at least one secondary tuple.

56. The non-transitory computer readable device of claim 43, wherein the performing at least one operation corresponding to the at least one subdivision of the at least one secondary logical hierarchical data space comprises deleting at least one secondary tuple.

57. The non-transitory computer readable device of claim 43, wherein the performing at least one operation corresponding to the at least one subdivision of the at least one secondary logical hierarchical data space comprises storing at least one hierarchical path identifier that identifies the at least one subdivision of the at least one primary logical hierarchical data space.

58. The non-transitory computer readable device of claim 43, wherein the performing at least one operation corresponding to the at least one subdivision of the at least one secondary logical hierarchical data space comprises probabilistic filtering a plurality of tuples corresponding to the at least one subdivision of the at least one secondary logical hierarchical data space.

59. The non-transitory computer readable device of claim 43, wherein the performing at least one operation corresponding to the at least one subdivision of the at least one secondary logical hierarchical data space comprises retrieving at least one secondary tuple.

60. The non-transitory computer readable device of claim 59, wherein the performing at least one operation corresponding to the at least one subdivision of the at least one secondary logical hierarchical data space comprises joining the at least one primary tuple with the at least one secondary tuple.

61. The non-transitory computer readable device of claim 43, further comprising storing a plurality of tuples corresponding to the at least one primary logical hierarchical data space and a plurality of tuples corresponding to the at least one secondary logical hierarchical data space in a shared physical hierarchical data space, wherein the shared physical hierarchical data space comprises a plurality of subdivisions.

62. The non-transitory computer readable device of claim 61, wherein determining the at least one subdivision of the at least one primary logical hierarchical data space comprises traversing the subdivisions of the shared physical hierarchical data space.

63. The non-transitory computer readable device of claim 61, wherein determining the at least one subdivision of the at least one secondary logical hierarchical data space comprises traversing the subdivisions of the shared physical hierarchical data space.

\* \* \* \* \*